July 27, 1965  R. P. SANDERS ETAL  3,197,566
CALL REROUTING ARRANGEMENT
Filed Feb. 13, 1962  12 Sheets-Sheet 2
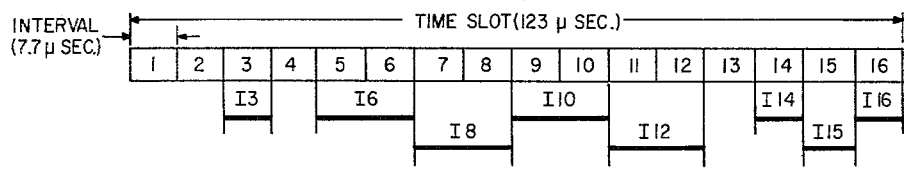
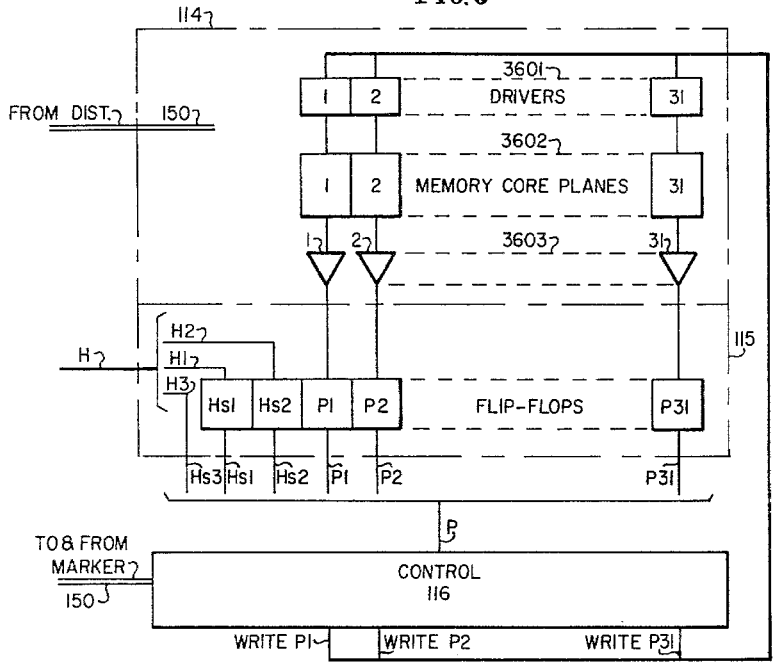
FIG.14 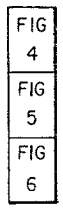  FIG.15 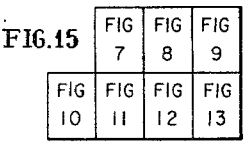

United States Patent Office 3,197,566
Patented July 27, 1965

3,197,566
CALL REROUTING ARRANGEMENT
Richard P. Sanders, Lisle, and John G. van Bosse, Park
Ridge, Ill., assignors to Automatic Electric Laboratories,
Inc., Northlake, Ill., a corporation of Delaware
Filed Feb. 13, 1962, Ser. No. 173,006
4 Claims. (Cl. 179—18)

This invention relates to a call rerouting arrangement, and more particularly to such an arrangement for an electronic-marker controlled switching system.

A private automatic exchange (PAX) is described in the copending United States patent application Serial No. 845,901, filed October 12, 1959 by John G. van Bosse for an Electronic Switching System, now Patent No. 3,133,154. The system comprises a crosspoint switching network controlled by a marker. The control apparatus other than the marker is shared on a time division multiplex basis by all of the line circuits. The multiplex apparatus includes a ferrite core memory connected with the control apparatus in a recirculating arrangement. The marker is called in by the line circuit control apparatus on a one at a time basis, and uses multiplex cycles to perform each of such functions as busy test, route search, connection, and disconnection. Each line circuit has associated therewith several memory elements forming a word. This word stores functions such as the subscriber state, timing, dialed digits, and also the route of a connection which has been established involving that line. The marker, when seized by a calling line, makes a busy test and then a route search by scanning the route storage elements of all of the lines. Then in a succeeding cycle a command is transmitted to the crosspoint network to establish the connection, and the identity of the connection is stored in the memory words of both the calling and the called line.

The object of the present invention is to provide such an electronic-marker controlled switching system with a call rerouting arrangement, so that a party who expects to be absent from his station may cause calls to his line to be forwarded to another selected line.

According to the invention, the control apparatus is arranged so that in response to the dialing of a special digit followed by the selected number, the address of that number is stored and the line is tagged as being in the rerouting condition. The marker is arranged so that when a busy test is made of a called line which is tagged with the reroute state, the number to which calls are to be rerouted is absorbed into the marker register as the called line to replace the original called number address, and the busy test cycle is repeated.

The reroute feature may also be used on operator lines to supplant the night service arrangement. In the PABX, incoming trunk calls and local calls directed to the operator cause the marker to enter a special hunting cycle to find an idle one of a group of operator lines. If the line selected during the hunt is in the reroute state, the marker then enters a regular busy test cycle during which it absorbs from the register of the selected line the address of the line to which calls are to be rerouted. Then the marker enters another busy test cycle with the reroute address as the called number.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 15 wherein:

FIG. 2 is a diagram showing steps of the interval counter, and its output signals;

FIGS. 3 is a symbolic diagram showing the recirculating memory, flip-flops and subscriber logic control;

Figure 4:
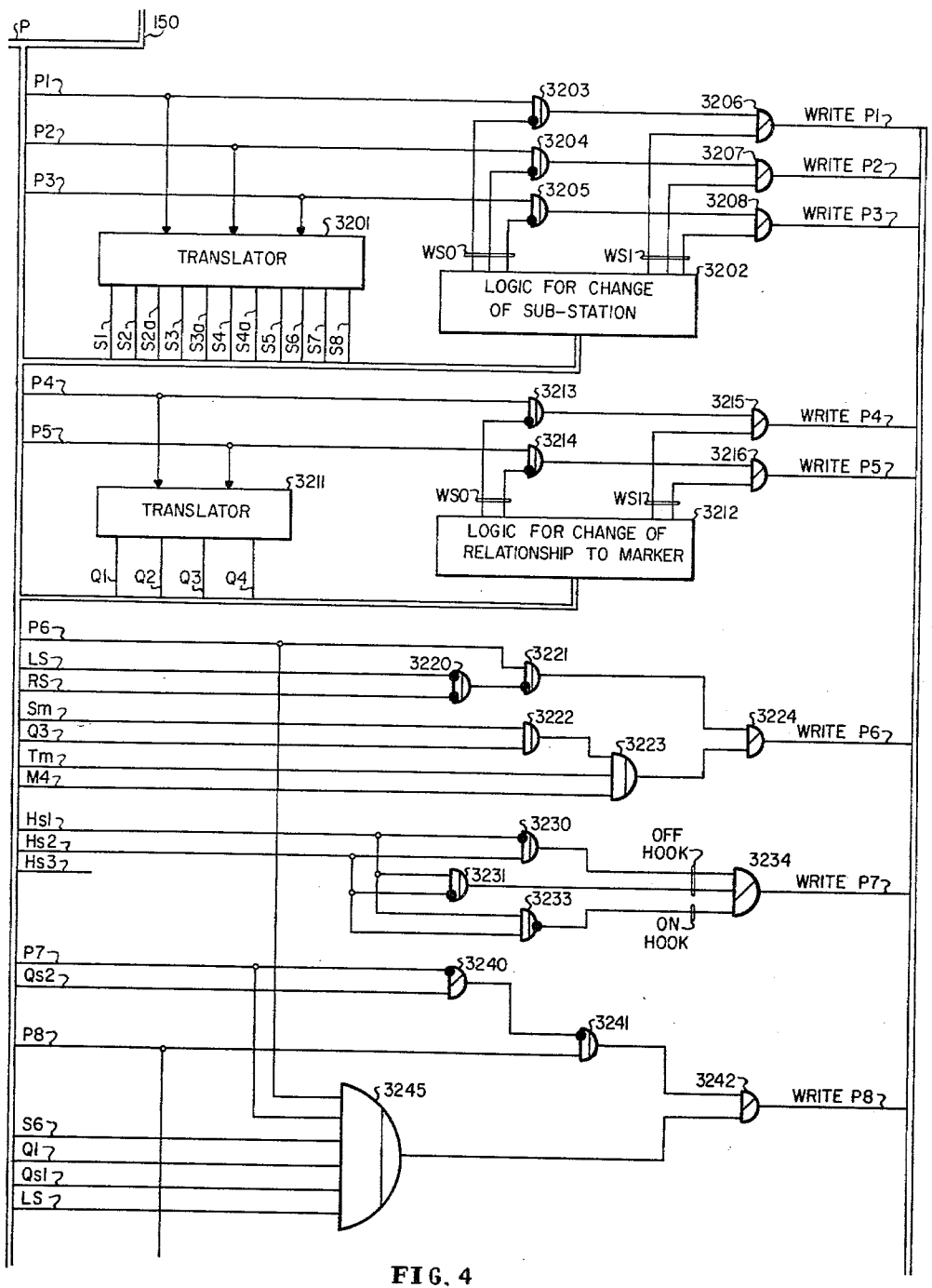
Figure 5:
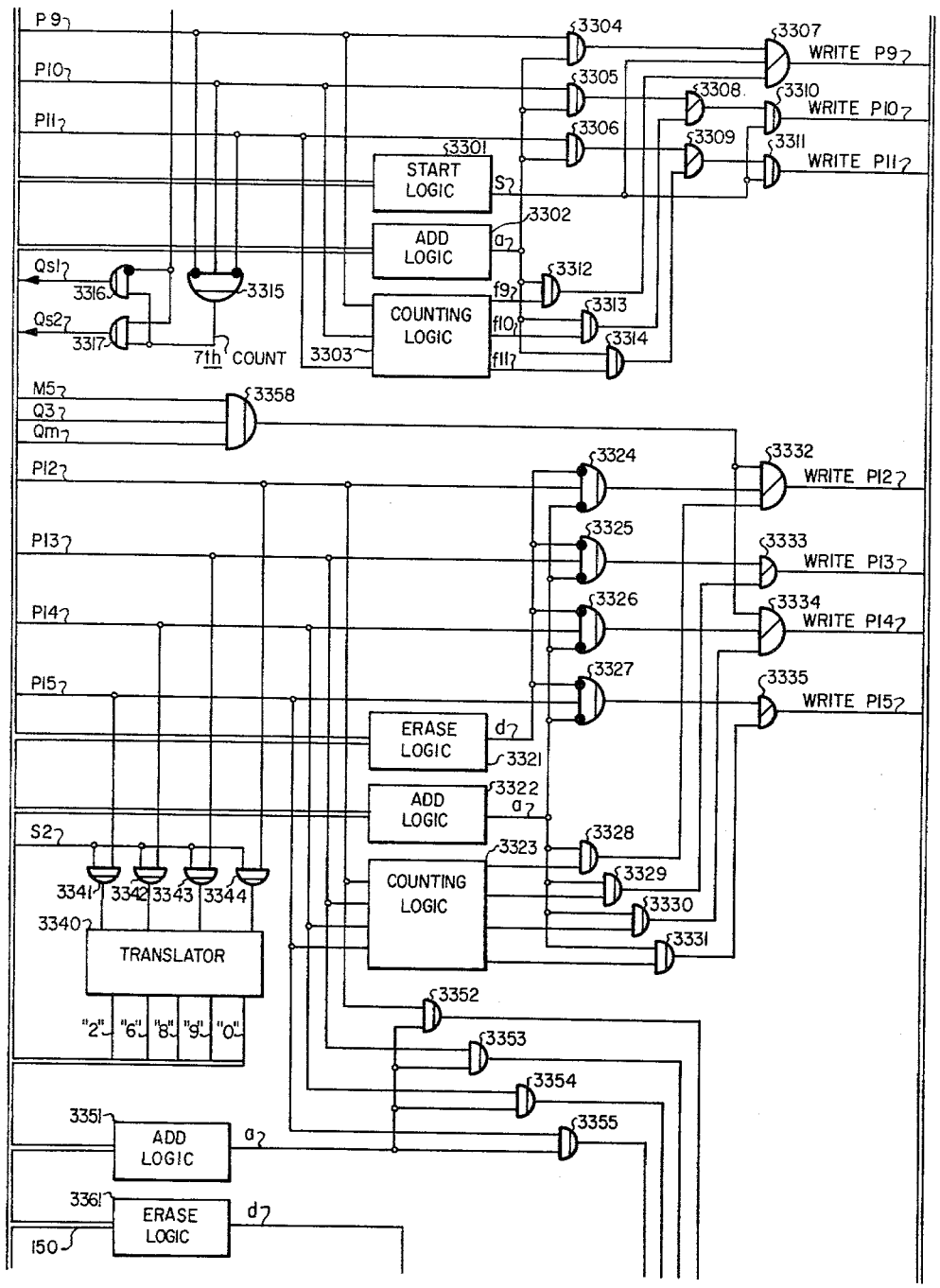
Figure 6:
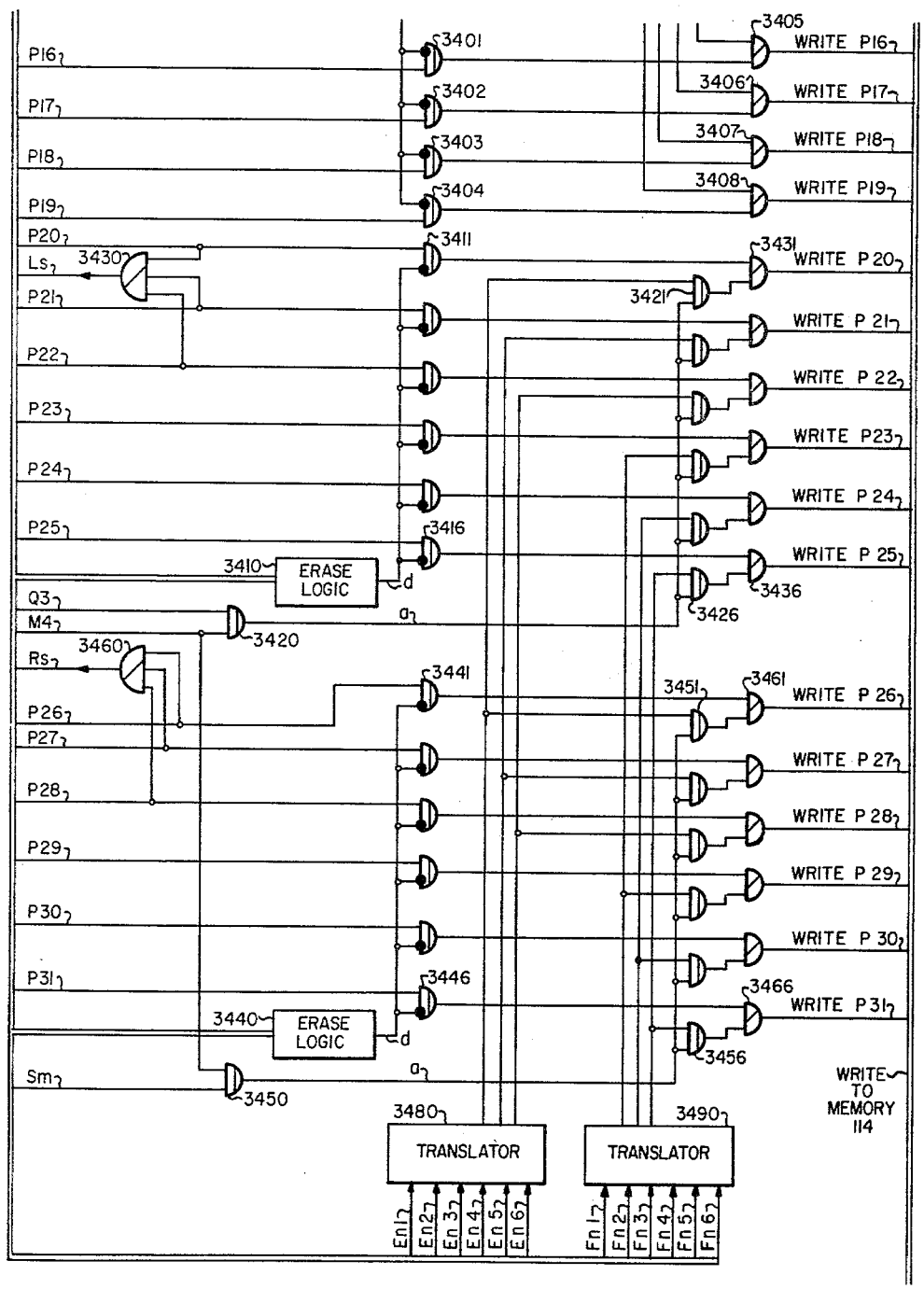

FIGS. 4–6 when arranged as shown in FIG. 14 comprise a functional block diagram of the subscriber logic control;

FIGS. 7–13 when arranged as shown in FIG. 15 comprise a functional block diagram of the marker;

FIGS. 14 and 15 show how FIGS. 4–6 and 7–13 are to be arranged.

GENERAL DESCRIPTION

Figure 1:
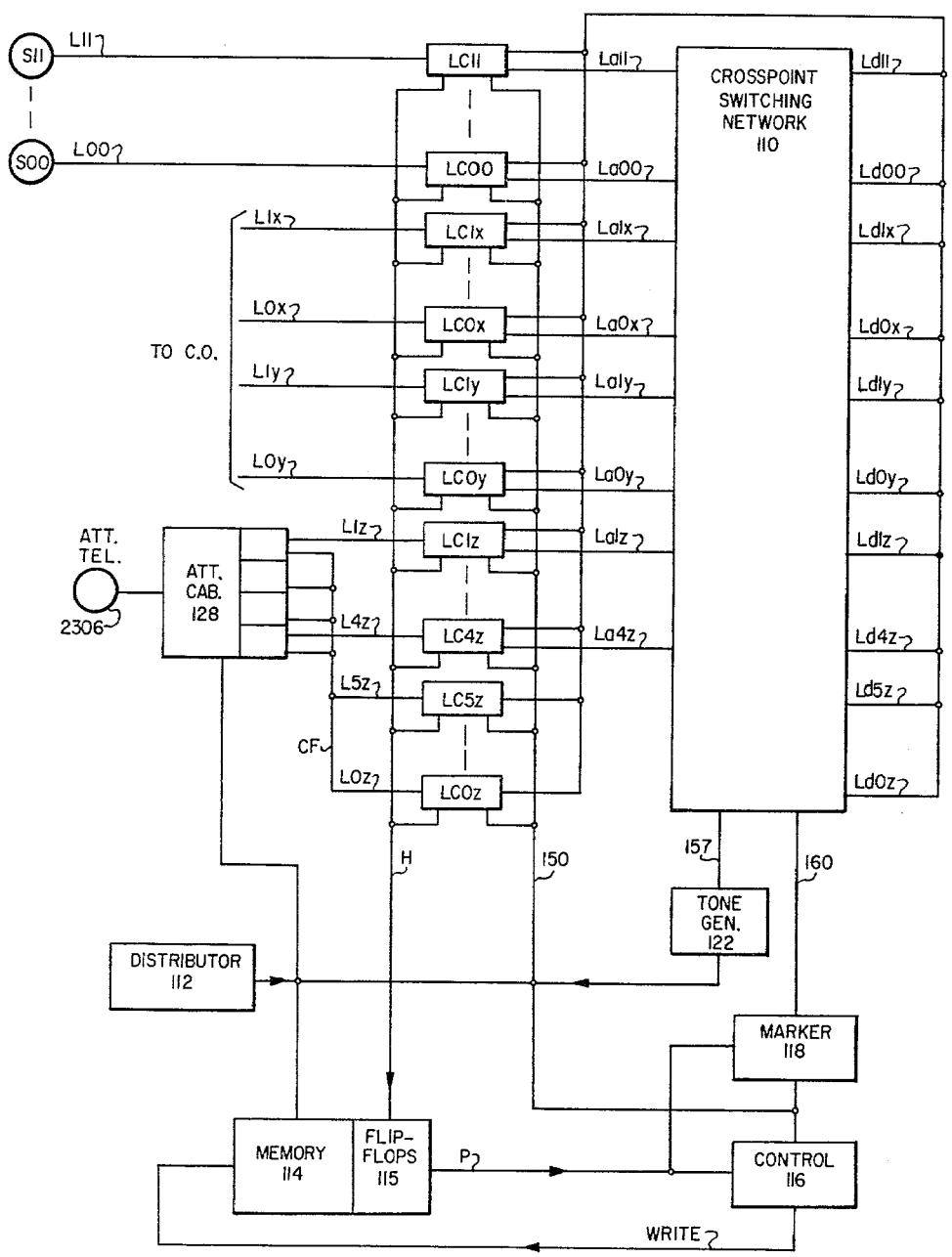
FIG. 1 is a block diagram of a private automatic branch exchange.

It has been chosen to describe the invention as embodied in a 100-line private automatic branch exchange, as shown in FIG. 1 by a block diagram. The system is generally similar to the isolated private aromatic exchange (PAX) disclosed in a copending United States patent application by John G. van Bosse for an Electronic Switching System, Serial No. 845,901, filed October 12, 1959. To meet the requirements of a PABX, equipment has been added to provide supervisory signals, conference access, and trunk circuits. The United States patent applications of Donald K. Melvin for an Electronic Switching System and Line Circuits Therefor, Serial No. 85,741, filed January 30, 1961; of Ronald F. Kowalik for a Communication Switching Network, Serial No. 85,875, filed January 30, 1961; of R. P. Sanders, J. G. van Bosse and D. K. Melvin for an Electronic Switching System, Serial No. 145,680, filed October 17, 1961; and of W. R. Wedmore and R. P. Sanders for an Electronic Switching System and Attendant's Arrangement Therefor, Serial No. 147,985, filed Novebmber 1, 1961 relate to some of the PABX features. The last two of said applications may be referred to for a full description of the PABX system.

As shown in FIG. 1, the PABX serves one hundred local lines L11–L00, ten PBX trunks L1x–L0x, ten two-way dial trunks L1y–L0y, six lines L5z–L0z for a meet-me conference circuit CF, and four operator circuits L1z–L4z to an attendant's cabinet 128. Transmission paths between these lines may be selectively established by way of the line and trunk circuits LC11–LC0z and and a crosspoint network 110. The exchange provides trunk transfer facilities, trunk restriction for selected subscribers, and night service. There are direct trunk facilities which allow the operator to link her telephone directly to a trunk, thereby bypassing the electronic exchange in the event of malfunction. The telephones for the PABX subscribers are conventional telephone instruments modified for tone ringing. A three-digit number scheme is used in which the first digit is used to access the particular service desired. The digit 6 is for local calls, digit 8 for conference, digit 9 for trunks, and digit 0 for operator service. The exchange uses semiconductor components including diodes and transistors. The crosspoint elements of the network 110 are four-layer diodes.

*The distributor.*—The control actions in this system are on a time-division basis. The distributor 112 is a pulse train generator which supplies a series of pulses to synchronize the different parts of the system. Since it is an independent unit, receiving no input from other parts of the system, it is able to generate independent commands, assuring the execution of logical operations in the proper sequence.

A wide variety of pulse-trains are produced and fed as separate outputs to the rest of the system. Each pulse-train has a specific position in time with respect to each other pulse-train. In this manner, a certain period of time can be defined by the presence of one or more of the pulses.

This PABX has 130 time slots, each slot being 123 microseconds long. The time slots are divided between one hundred local subscribers, twenty trunks, four operator circuits, and six conference circuits. The system cycle is 16 milliseconds (130 time slots times 123 microseconds). The distributor generates the following pulses:

(1) Tens pulses, each equal to 1.6 milliseconds (13 time slots).

(2) Units pulses, each equal to 123 microseconds (1 time slot).

(3) Interval pulses, each equal to 7.7 microseconds.

*The memory.*—This PABX employs a ferrite-core temporary memory 114 of 130 words that is, a word is assigned to each PABX subscriber, trunk, operator, and conference circuit. Each word has 31 bits which gives various information about the status of the subscriber (or trunk, operator, or conference circuit). The flip-flops of unit 115 provide buffer storage for supplying output signals from the memory 114 to the control 116 and marker 118.

*The marker.*—The marker 118, a decision making intermediary between PABX subscribers and the switching network, is a logical network which may be considered to be stationary with respect to the periodic time reference established by the distributor 112. It is capable of reviewing the status of each subscriber in turn. Basically, the marker 118 is the means by which information is conveyed from one subscriber time slot to another, and is the logical network that supervises the establishment and termination of audio paths through the switching network.

The marker 118 consists of a number of bistable storage and coding devices (flip-flops), logic building blocks (NOR gates), a parity checker, and translation matrices. The parity checker is a comparison network that yields an output signal when the input from one source is found to be identical with the input from a second source. Information is supplied to the switching network in different codings. Consequently, a translation matrix is used to translate these different codes and subsequently transfer this translated information to the switching network.

*Subscriber logic.*—The subscriber logic control unit 116 is a NOR-gate logical network, the function of which is to control the storage of information in the ferrite-core memory 114 in each subscriber's time slot. It also acts on this information, and on the marker information, and multiplex highway information, in such a manner as to determine what information should be written into the memory at the end of each time slot. Subscriber logic is used by each subscriber line during the time assigned him.

Subscriber logic is composed of bistable storage elements (flip-flops) and logic building-blocks (NOR gates).

*Switching network.*—The purpose of the switching network 110 is to provide a means of establishing and maintaining an audio connection between selected lines and trunks. The network consists of a four-stage crosspoint array which uses PNPN diodes as crosspoint switches. Each stage consists of groups of matrices made up of vertical and horizontal rows of connections where a PNPN diode is connected at each crosspoint. Each subscriber's line equipment is connected to both ends of the network so that a subscriber may act as either a calling party or a called party, or both. A split junctor is used in the center of the network for applying part of the potentials to the crosspoints, gating the ringback and ringing signals, and supplying the necessary holding current to the PNPN diodes. In addition, the switching network provides the facilities for breaking down the audio connection, once the subscribers have concluded their conversation.

*Line equipment.*—Each PABX subscriber, PBX trunk, two-way dial trunk, operator circuit and conference circuit has an associated line circuit LC11–LC0z. Each line circuit terminates its line loop and also provides an audio connection to the crosspoint switching network. Each subscriber line circuit LC11–LC00 has sensing elements that reflect the conditions of its line loop; by opening and closing the line loop with either the hookswitch or dial springs, a subscriber may make his intentions known. The line circuit also determines when certain supervisory signals should be supplied to a subscriber.

*Trunk circuits.*—There are facilities for ten two-way dial trunks (permitting in- and out-dialing) and ten PBX trunks (on which all incoming calls are directed to the attendant's cabinet). Associated with the trunks are a number of NOR gates, flip-flops, relay drivers, and relays. These components and circuits are arranged in such a way as to enable the electronic PABX to function with the electromechanical, step-by-step, central office.

Only unrestricted subscribers may dial directly over trunks to the central office. A restricted subscriber may obtain a trunk via the operator.

Incoming PBX trunks are always directed to the operator unless night service facilities are provided. Two-way dial trunks may dial directly into the PABX.

*Attendant's cabinet.*—In this system, the attendant's cabinet is a cordless, desk-mounted, turret-type cabinet. Besides providing regular attendant's service on incoming calls, it provides night service, conference, transfer, and intercept facilities.

There are four operator lines, each having an appearance on the cabinet of a conference key, a three-position answer key (normal, answer, and hold) and two lamps (local and trunk) which flash when the operator action is desired and burn steadily when attendant answers.

DISTRIBUTOR AND MEMORY

The basic distributor cycle has a duration of 16 milliseconds divided into 130 time slots of 123 microseconds each.

An interval counter (not shown) makes one step each 7.7 microseconds, and has a cycle of 16 steps. Thus each cycle is equal in duration to one time slot. The 16 steps are shown in the diagram of FIG. 2. The output signals I3, I14, I15, and I16 each have a duration of one interval step and occur during the corresponding step as indicated in FIG. 2. The output signals I6, I8, I10, and I12 each have a duration of two steps and occur during the intervals as shown in FIG. 2. During the signal I3 the memory information is read into the flip-flops P1–P31 and the signals from the highway H are read into the flip-flops HS1 and HS2. The signals I6, I8, I10, and I12 are used to trigger the exchange of information between the control unit 116 and the marker 118. The signal I14 is used to trigger the writing of information into the memory from the control unit 116. The signal I15 is used to cause the marker to change state when necessary. The signal I16 is used to reset the flip-flops P1 to P31 and HS1 and HS2.

The units counter (not shown) makes 13 steps each equal in duration to one time slot (123 microseconds). The output signals U1 to U9, U0, U$x$, U$y$, and U$z$ occur respectively during these 13 steps. There are also four output signals U$c1$, U$c2$, U$c3$, and U$c4$ which represent the units digit in binary code.

The tens counter (not shown) makes one step every 13 time slots (1.6 milliseconds) and produces as outputs the tens signals T1 to T9 and T0. There are also four output leads TC1, TC2, TC3, and TC4 which represent the tens digit in binary code.

A clock pulse C$p3$ of 1.9 microseconds duration occurs at the end of every 7.7-microsecond interval. A clock pulse C$p4$ occurs at the end of every even step of the interval counter. Thus during the double intervals I6, I8, I10 and I12 the signal C$p4$ will occur at the end of each.

The distributor also supplies a long count signal Lc which has a duration of one cycle (16 milliseconds) and occurs approximately once every two seconds.

The memory is shown symbolically in FIG. 3. The principal portion of the memory comprises 31 memory core planes 3602. Each of these planes contains 130 cores. Therefore the memory accommodates 130 words of 31 bits each. Circuitry is connected between the leads from the distributor and the memory core planes, so that during each time slot one core per plane is controlled. The input is selectively controlled by the 31 drivers 3601, and the ouput is taken through 31 amplifiers 3603 to the flip-flops P1 to P31. Thus during the interval I3 of each time slot the memory core planes are supplied with read current to the corresponding core of each plane, and the output is detected by the sense amplifiers to selectively set the flip-flops P1 to P31 in accordance with the output signals. The flip-flops HS1 and HS2 are also selectively set at this time in accordance with the signal conditions on the highway conductors H1 and H2. This information is then available to the subscriber logic control unit 116 and may be selectively modified during the time slot. At the end of the time slot the new signal conditions appear on the output leads write P1 to write P31. These signals are supplied to the inputs of the respective drivers 3601, and during interval I14 the information is selectively written into the corresponding core of each of the planes 3602.

*Logical control.*—The system (FIG. 1) uses a space-division transmission concept in which a PNPN silicon diode is employed as the crosspoint element within a four-stage switching network 110. Control logic or subscriber logic 116 is shared by subscribers through time-division techniques. A system clock and a logic-distribution network (distributor 112) establish a 16-millisecond machine cycle and subdivisions thereof that regulate the multiplexing operation. Pertinent information concerning each subscriber line is retained within a ferrite-core memory 114 during the period subscriber logic is not at the subscriber's disposal. The marker 118 is a logic network that is stationary with respect to the time reference established by the distributor, and therefore capable of reviewing the status of each subscriber on a one-at-a-time basis. The marker is used to convey information from one subscriber register in the memory to another and to perform the function from which it derives its name: that of marking the path through the crosspoint switching network that is to be used for a pending connection.

Boolean algebra is used to express the logic conditions of the system. In the equations the addition symbol (+) is used for the OR function, the multiplication symbol (expressed or implied) is used for the AND function, and the prime symbol (') for inversion. In actual construction, NOR logic is used. However for convenience in the drawing, some logic conditons are shown by AND, OR, or NOR gates. A small circle at an input or output of a gate indicates inversion. The flip-flops require coincidence of a D.C. and an A.C. input to set or reset them. The D.C. inputs are shown opposite the outputs, and the A.C. inputs are shown at the sides.

SUBSCRIBER LOGIC

Because there are, in all, 130 lines, or subscribers, within the system, the distributor divides the 16-millisecond machine cycle into one hundred and thirty 123-microsecond divisions called time slots. The time slot is further sub-divided into 16 equal intervals of 7.7 microseconds duration each.

In forming time slots, the distributor generates 13 units pulses (denoted U1, U2, U3, . . . U9, U0, Ux, Uy, Uz) of 123 microseconds length and recurring sequentially every 1600 microsecond, and 10 tens pulses (designated T1, T2, . . . T0) of 1600 microseconds duration which recur every 16 milliseconds or, in other words, every machine cycle. A complete units pulse train is contained within each tens pulse. The coincidence of a units pulse and a tens pulse designates a time slot. Time slot 68, for instance, would be generated by the simultaneous occurrence of T6 and U8.

Each subscriber line is permanently assigned a time slot during which its status is analyzed by the subscriber logic and reviewed by the marker. The one hundred time slots having units pulses U1–U0 are assigned to local PABX subscribers, the ten time slots having units pulse Ux are assigned to PBX trunks, and the ten time slots having units pulse Uy are assigned to the two-way dial trunks. The four operator lines use the time slots having tens pulses T1–T4 respectively and units pulse Uz, and the six meet-me conference lines use the time slots having tens pulses T5–T0 respectively and units pulse Uz. By interrogating the distributor, the marker may readily discern the identity of the subscriber line.

Three separate multiplex highway conductors (H1, H2, and H3) inform the subscriber logic of conditions existing within the subscriber's line circuit. H1 and H2 are generated in such a way as to reflect the condition of the line-loop (open or closed) and, as well, the status of a subscriber with regard to trunk restriction. The resulting code appears below.

H1 H2—Idle line
H1' H2—Unrestricted subscriber off hook
H1 H2'—Restricted subscriber off hook
H1' H2'—Unequipped line A subscriber's line-loop condition, as seen by the subscriber logic, must remain constant for the duration of the time slot in order that all activities occurring within the time slot will be based on the same information. H1 and H2 are therefore sampled early in the time slot of the subscriber line, and their sense retained within bi-stable multivibrators (flip-flops) Hs1 and Hs2 for the duration of the reviewing period.

A third multiplex highway, H3, will exhibit a binary "1" within the time slot of a subscriber line designated to be the recipient of incoming PBX trunk calls during night service operation. The signal emanates from the subscriber's line circuit, and its binary value is determined by a strapping option.

As has been noted, H1, H2, and H3 are multiplex quantities. Each of the signals is generated within the line equipment of each subscriber, is associated with the distributor address of the subscriber, and is funneled into the subscriber logic via a logical network which is, in effect, a 130-input OR gate.

Permanently associated with each time slot, and therefore with each subscriber line, is a 31-bit memory-word that retains, between reviewing periods, pertinent information concerning the subscriber's activities as follows:

| Bits | Information |
|---|---|
| 1-3 | Subscriber action. |
| 4-5 | Relationship to marker. |
| 6 | Connected to a trunk. |
| 7 | Last cycle line loop condition. |
| 8 | Long count timer control and call rerouting state indication. |
| 9-11 | Timer. |
| 12-15 | Digit counter and storage. |
| 16-19 | Digit storage. |
| 20-22 | Calling party's routing register: "B" switch number. |
| 23-25 | "C" switch number. |
| 26-28 | Called party's routing register: "B" switch number. |
| 29-31 | "C" switch number. |

The memory-word is read into 31 buffer flip-flops early in the subscriber's time slot; near the end of the time slot the information, as revised by subscriber logic, is written into the memory.

The first three bits of the memory-word form a code as shown in Table I, which is descriptive of the activity in which the subscriber is engaged. The eight resulting states are designated S1, S2, . . . S8. There are also states S2a, S3a, and S4a which occur while dialing a number to which calls are to be rerouted. These states are indicated by bit 8 being true.

Table I

| State | Description | P1 | P2 | P3 | P8 |
|---|---|---|---|---|---|
| S1 | Idle | 0 | 0 | 0 | |
| S2 | Dialing First Digit | 1 | 0 | 0 | 0 |
| S2a | Dialing Reroute Registration | 1 | 0 | 0 | 1 |
| S3 | Dialing Second Digit | 0 | 1 | 0 | 0 |
| S3a | Dialing Reroute Registration | 0 | 1 | 0 | 1 |
| S4 | Dialing Third Digit | 1 | 1 | 0 | 0 |
| S4a | Dialing Reroute Registration | 1 | 1 | 0 | 1 |
| S5 | Receiving Busy Tone | 0 | 0 | 1 | |
| S6 | Connected—Not Talking | 1 | 0 | 1 | |
| S7 | Connected and Talking | 0 | 1 | 1 | |
| S8 | Disconnecting | 1 | 1 | 1 | |

The next two bits form a second code (Q1, Q2, . . . Q4) as shown in Table II, that indicates the relationship between the subscriber and the marker.

Table II

| State | Description | P4 | P5 |
|---|---|---|---|
| Q1 | Idle | 0 | 0 |
| Q2 | Demanding The Marker | 1 | 0 |
| Q3 | Being Serviced by the Marker as a Calling Party | 1 | 1 |
| Q4 | Selected by the Marker as a Called Party | 0 | 1 |

A subscriber who is a called party and has dialed the number of a second subscriber is, if he is not connected to a trunk, attempting to establish a chain call. If, however, the subscriber is presently engaged in conversation over a trunk, the system must react by performing the operations necessary to effect a trunk transfer. It is apparent, then, that the system must be able to discern which subscriber lines are connected to trunks. Bit 6 of the memory word serves this end; a binary "1" is stored in bit 6 whenever a subscriber is involved with a trunk.

Memory bit 7 will contain a binary "1" if, during the previous reviewing period, information on the multiplex highways indicated that the subscriber's line-loop was closed. By comparing bit 7 to the current status of the line-loop, the transition from open loop to closed loop or from closed to open may be detected.

Bits 9, 10, and 11 form a counter capable of counting from zero to seven. Although the counter has been adapted to other uses, its primary function is to determine the length of time between changes in line-loop condition during states S2, S3, and S4 in which dialing activity occurs. The counter begins to count when the first change in the loop condition is detected and advances one count every machine cycle that the line-loop status remains unaltered. When the line-loop condition changes before the counter reaches a count of seven, the counter reverts to a count of one and begins to count again. When counting in this mode, the realization of a count of seven generates the intermediate quantity Qs1. This signal is interpreted as meaning that the line-loop condition has remained unchanged for a period of 16 milliseconds times seven, or 112 milliseconds. The maximum make or break period occurring during a dial pulse train is approximately 60 milliseconds. Therefore, Qs1 can never become true (be generated) until the pulse train is completed. When Qs1 is generated, assumptions may be made regarding the subscriber's action, based on the binary value of bit 7 at the time.

P7 Qs1—A dial-pulse train has been completed and the subscriber is pursuing the call.

P7' Qs1—The subscriber has hung up.

A mark is placed in bit 8 whenever it becomes desirable to cause the counter of bits 9–11 to perform a special counting operation, with bit 6 true. It is necessary, for instance, to cause the system to disregard the dialing activity of a subscriber who has obtained a trunk and is outpulsing. The subscriber is allowed a given period of time to accomplish this activity. This relatively long counting operation is regulated by bit 8. Also for rerouting, bit 8 is used for coding subscriber states S2a, S3a, and S4a.

Memory bits 12, 13, 14, and 15 are grouped to form a counter capable of counting line-loop interruptions generated by the subscriber's dial. The counter adds one each time a transition from open loop to closed loop occurs. The count continues until Qs1 becomes true, denoting the end of a dial-pulse train. The counter is coded in binary form with 8-4-2-1 weighting. The dialed hundreds digit, since it is an access digit, is discarded when its value has been determined. At the completion of the tens pulse train, the digit is transferred from the counter to bits 16, 17, 18, and 19 for storage. The pulses which comprise the dialed-units digit are then counted, as were dialed hundreds and tens. The units digit is stored within the counter. Dialed digits are retained in their storage areas for only the duration of their usefulness.

The crosspoint address of a connection in which a subscriber is engaged is stored in bits 20–31. The address may be defined as the number of the XB switch and the number of the XC switch used to connect the two subscriber lines. This is identical to the number of the junctor used to establish the connection. The crosspoint address of a connection is stored within the calling party's register in bits 20–25. The first three bits 20–22 (PLB store) of this group record the number of the B switch; the last three bits 23–25 (PLC store) identify the C switch. A called party must refer to bits 26–28 (PRB store) and bits 29–31 (PRC store) to obtain the numbers of the XB and XC switches, respectively, through which his audio path is established.

Information within routing storage areas is written and erased under the influence of the marker during connection and disconnection cycles respectively.

Two important intermediate quantities are used extensively to describe a subscriber's status. Ls, which denotes a calling party, is generated when information is found to be stored in bits 20–25. Rs is true if a subscriber is a called party (if he has information within bits 26–31 of his memory word).

The common control logic, or subscriber logic, is a logical network that controls the memory word of each subscriber. It acts upon this information, multiplex highway information, and marker information, in such a way as to determine what information should be written into the memory at the end of each time slot. Subscriber logic acts upon the memory word of each subscriber in turn during his assigned time slot.

The subscriber logic also exchanges information with the marker. To insure that the marker is not called upon to perform impossible or disallowed actions, the subscriber logic discerns which subscriber demands are to be acted upon.

Certain supervisory signals (busy tone and dial tone) are supplied to subscribers via their line equipment. Subscriber logic regulates the application of these signals.

Special "subscribers"—such as trunk and attendant lines—require special control and supervisory features not provided normal PABX subscribers. The inclusion of these features necessitates an expansion of the memory words of these lines, as well as the development of additional logic networks.

The subscriber logic control unit 116 is shown in the functional block diagram of FIG. 4, FIG. 5 and FIG. 6. Referring to FIG. 4, the translator 3201 translates the signals P1, P2 and P3 into the eight subscriber state signals S1 to S8. The logic for changing the subscriber states is shown as block 3202. The signal outputs for writing a "1" are designated Ws1, and the signals for writing a "0" are designated Ws0. If there is to be no change during a particular cycle the outputs Ws1 and Ws0 are all "0" so that the gates 3203, 3204 and 3205 are enabled by the "0" signals to the inhibit inputs of these gates, and the signals P1, P2 and P3 are recirculated by passing first through the AND gates 3203, 3204 and 3205 respectively and thence through the OR gates 3206, 3207 and 3208 respectively to the write control input to the memory, thereby recirculating the information. The logic for change of subscriber state is as follows:

LOGIC 3202

$P1-Ws1 = S1[Q1(Hs1'+Hs2')+Q4\ M5$
$\qquad +S3\ Qs1+S5(Ux+Uy)Sm+P7']$
$\qquad +S7(Ls+Rs)Hs1\ Hs2+S7\ Sm(M7+M13)$
$\qquad (Ls\ Rs)'$ $P1-Ws0 = S2\ Q1\ P7[Uy+Q1\ "6"\ (Ls'+P6)]$
$\qquad +Q3\ M5\ S5\ Im\ Qm+Q1\ Ls'\ Rs'(S6+S8\ P7')$
$\qquad +S6\{Q1[Rs\ U13(T5+T6+T7+T8+T9$
$\qquad +T0)+LsQ2+LsLsP6'+RsP6'P7]+Q2$
$\qquad M1\}$ $P2-Ws1 = S2\ Q2\ P7\ [Uy+Qs1\ "6"(Ls'+P6)]$
$\qquad +(S2+S6\ Ls)\ Q1\ P7'\ Qs1+S6\{Q1[Rs\ Uz$
$\qquad (T5+T6+T7+T8+T9+T0)+Ls\ Q2+Ls$
$\qquad P6'+Rs\ P6'\ P7]+Q2\ M1\}$ $P2-Ws0 = Q2\ M1\ Ls+Q3\ M5(Ls\ Rs\ P6)'$
$\qquad +S7(Ls+Rs)Hs1\ Hs2+Q1\ Ls'\ Rs'[S6+S8$
$\qquad +S7(Ux'+QS1)]+S7\ M13\ Sm(Ls\ Rs)'$
$\qquad +S8(Q1\ P7+Q2\ M1)$ $P3-Ws1 = S2\ Q1\ P7\ Qs1\{[Ls'\ Rs'\ ("9"+"8")+Rs'\ P6$
$\qquad "2"+"3"+"0"+"6"](Ls'+P6)\}+M5\ Q4$
$\qquad +(S2+S3+S4)\ (Q2\ M1\ Ls+Q1\ P7'\ Qs1)$
$\qquad +Q3\ M5(Ls\ Rs\ P6+Qm)'$ $P3-Ws0 = S7\ Sm(Ls\ Rs)'\ (M7+M13)+S8\ Q1\ P7$
$\qquad +[S6+S8+S7(Ux'+QS1)]Ls'\ Rs'\ Q1$
$\qquad +S7(Ls+Rs)Hs1\ Hs2$ The signals P4 and P5 are translated by unit 3211 to supply the four signals Q1 to Q4. The logic for changing the state of these four signals is shown in block 3212. If all of the outputs from this unit are "0," the AND gates 3213 and 3214 are enabled by the "0" signals at their inhibit inputs, so that the signals P4 and P5 are recirculated by passing through the AND gates 3213 and 3214 respectively and thence through the OR gates 3215 and 3216 respectively to the write control signals to the memory. The logic for changing the relationship to the marker is given by the following equations:

LOGIC 3212

$P4-Ws1 = S4\ Q1\ P7\ Qs1\ P8'+S2\ Q1\{Uy'\ P7\ Qs1\ [Ls'$
$\qquad Rs'("9"+"8")+R'P6"2"+"0"](Ls'+P6)$
$\qquad +Ux\ P7\}+S7(M7+M13)Sm(Ls\ Rs)'+S6$
$\qquad Q1\ P7\ Ls'\ P6+S8\ Q1\ P7'\ (Ls+P6)$ $P4-Ws0 = Q3\ M5(Ls\ Rs\ P6+Qm)'+(Q2\ M1(Ls+P3)$ $P5-Ws1 = S1\ Q1\ Hs1\ Hs2\ Sm(M2+M6+M8+M9$
$\qquad +M10+M11)P3'\ Q2\ M1\ Ls'+S7(M7$
$\qquad +M13)\ Sm(Ls\ Rs)'$ $P5-Ws0 = M5\ P5$ The bit 6 is used to indicate the connection to a trunk. The writer "1" logic (Ws1) is shown by gates 3222 and 3223, and the write "0" (Ws0) is shown by gate 3220. If the outputs of both of these gates is "0" the signal P6 is recirculated by passing through gates 3221 and 3224 to the write control input to the memory. The equations tre as follows:

$P6-Ws1 = Tm\ M4(Sm+Q3)$
$P6-Ws0 = Ls'\ Rs'$

The bit 7 is used to indicate the last cycle loop condition. The logic for writing a "1" (Ws1) in response to an off-hook signal is given by gates 3230 and 3231, and the logic for writing a "0" (Ws0) in response to an on-hook signal is given by gate 3233. The outputs of these gates are passed through OR gate 3234 to supply the write control signals to the memory. The equations are as follows:

$P7-Ws1 = Hs1'\ Hs2+Hs1\ Hs2'$
$P7-Ws0 = Hs1\ Hs2$

The bit 8 is set whenever it is desirable to cause the timer to perform a timing operation under the influence of the long count signal Lc. The intermediate signal Qs2 becomes true when the counter counts to seven (coded as P9' P10 P11') and P8 is true. The logic for writing a "1" (Ws1) is given by gate 3245, and the logic for writing a "0" (Ws0) is given by gate 3240. If the outputs of both of these gates are "0" the signal P8 is recirculated by passing through gates 3241 and 3242 to supply the write control signal to the memory. Bit 8 is also set to indicate subscriber states S2a, S3a, and S4a. The equations are as follows:

$P8-Ws1 = S6\ Q1\ Qs1\ P6\ Ls\ P7$
$\qquad +S2\ "3"\ Qs1\ P7\ Ls'\ Rs'$
$P8-Ws0 = (Qs2+P7')\ S6+(S2+S3+S4)\ P7'\ Qs1$ Bits 9, 10 and 11 form a counter capable of counting from zero to seven, in accordance with a gray code. The counter is used at different times for different purposes.

During the subscriber states S2, S3, and S4, in which dialing occurs, the counter is used to determine the length of time between changes in line loop condition. The counter begins to count when the first change of line loop condition is noticed and advances one count every distributor cycle that the line loop remains unchanged. When the line loop condition changes before the counter reaches a count of seven, the counter reverts to a count of one and begins to count again. When counting in this manner, that is advancing the count once each cycle, a count of seven generates the intermediate signal Qs1, which indicates that the line loop condition has remained unchanged for a period of 16 milliseconds times 7 or 112 milliseconds. The maximum make or break period occurring during a dial pulse train is approximately 60 milliseconds. Therefore, the signals Qs1 can never become true until the pulse train is terminated. The bit 7 indicates the condition of the line loop in the last cycle. With the signals Qs1 and P7 both true, it is indicated that a dial pulse train has been completed and that the subscriber is preparing to dial another digit or has completed dialing. If the signal Qs1 is true and the signal P7 is false, this indicates that the subscriber has hung up.

When a subscriber calls a trunk, the subscriber is held in state S6 until approximately 15 seconds have elapsed since his last change of line loop condition in order to insure that the PABX will be unaffected by the dial pulse trains directed to the central office. The counter of bits 9 through 11 performs the counting action. Instead of adding one to the count each cycle, the counter advances whenever the signal Lc occurs. The counter conforms to this new counting mode whenever signal P8 is true.

The counter is also used to provide a time delay in the resetting of flip-flops associated with PBX trunks when they become disconnected (S7 Ls' Rs'). The delay allows sufficient time for electromechanical devices in the central office to release before the trunk again appears idle to the electronic exchange.

Referring now to FIG. 5, a start logic unit 3301 produces a signal s to start the counter and write the code 1-0-0 in the bits 9, 10, and 11 of the memory. The equation is as follows:

LOGIC 3301

$s = (S2+S3+S4+S6+S7+S8)Q1\{P7(Hs1'+Hs2')$
$\qquad +P7'\ Hs1\ Hs2\}'+S6\ Q1\ Qs1\ P7\ P6\ Ls$
$\qquad +S7\ Ls'\ Rs'\ Ux\ P9'\ P10'\ P11'+S6\ Q1\ P9'\ P10'\ P11'$ Whenever the counter is to be advanced one step, the add logic unit 3302 produces the signal $a$. The equation is as follows:

LOGIC 3302

$a = [P7(Hs1' + Hs2') + P7' \, Hs1 \, Hs2][Lc + (P8 \, S6)']$

The counting logic unit 3303 produces the signals $f9$, $f10$, and $f11$ in accordance with the following equations:

LOGIC 3303

$f9 = P9(P10 + P11')$
$f10 = P9 \, P11' + P9' \, P11$
$f11 = P9 \, P10 + P10' \, P11$

Whenever the signal $s$ from unit 3301 is true, a "1" is supplied through gate 3307 to write P9, and the gates 3310 and 3311 are inhibited to write zeros in P10 and P11. Whenever the signal $a$ is true the gates 3304, 3305 and 3306 are inhibited, and the gates 3312, 3313 and 3314 are enabled so that the signals $f9$, $f10$ and $f11$ control the output through gates 3307, 3308, 3309, 3310, and 3311. When the signals $s$ and $a$ are both false the three bits are recirculated through the gates 3304–3311.

The gate 3315 translates the three bits 9, 10 and 11 in accordance with the code 0–1–0 for the seventh count. If the bit 8 is false gate 3316 is enabled to supply the output signals Q$s$1. If bit 8 is true, gate 3316 is inhibited and gate 3317 is enabled to supply the output signal Q$s$2.

The memory bits 12, 13, 14, and 15 are grouped to form a counter capable of counting line loop interruptions generated by the subscriber's dial. The counter adds one each time a transition from open loop to closed loop occurs. The count continues until Q$s$1 becomes true denoting the completion of a dial pulse train. The counter is coded in binary from (8–4–2–1). A reduction in the amount of equipment is achieved by having only one counter to count any of the three digits, rather than having separate counters for each digit. The dialed hundreds digit is discarded after the appropriate functions have been performed by the subscriber logic control and by the marker. During changeover between the dialing of the tens digit and the dialing of the units digit, the tens digit is transferred to the storage unit of the memory comprising bits 16, 17, 18, and 19. Then the units digit is counted by the bits 12 to 15. The dialed tens and dialed units digits are then stored as long as they are needed, with the units digit in bits 12 to 15, and the tens digit in bits 16 to 19.

The bits 12 to 15 may be cleared by the erase logic unit 3321 supplying signal $d$ to inhibit the gates 3324, 3325, 3326, and 3327, the equation is as follows:

LOGIC 3321

$d = S3 \, Qs1 + S2 \, Q1 \, Qs1("2" + "8" + "9" + "0")' + S5 + S6 + S7 + S8 + M5 \, Q3 \, Qm$

Dial pulses are counted whenever the add logic unit 3322 supplies the signal $a$ in accordance with the following equation:

LOGIC 3322

$a = (S2 + S3 + S4)Q1 \, P7'(Hs1' + Hs2')$

This signal $a$ occurs in response to a transition from open loop to closed loop to inhibit the gates 3324 to 3327, and to enable the gates 3328, 3329, 3330, and 3331. This causes the count to be advanced one in accordance with the logic unit 3323. The output is supplied through gates 3332 to 3335 to cause the code to be written into the memory.

During subscriber state S2, the bits 12 to 15 are passed through gates 3341 to 3344 respectively to a translator 3340 to supply the hundreds digit signals "2," "6," "8," "9," and "0."

As a special case the gate 3358, in response to the condition (M5 Q3 Qm), writes the code 1–0–1–0 for "0" into the bits 12 to 15. This condition occurs if a called line is unequipped.

Referring to FIG. 6, the bits 16 to 19 are normally recirculated through gates 3401 to 3404 and 3405 to 3408.

In response to erase logic unit 3361 supplying signal $d$ the gates 3401 to 3404 are inhibited to clear these four bits of the memory. The equation is as follows:

LOGIC 3361

$d = S5 + S6 + S7 + S8$

In response to the signal $a$ from the add logic unit 3351, the signals P12 to P15 are transferred through gate 3352 to 3355 respectively and through gates 3405 to 3408 respectively to write in the bits 16 to 19 of the memory. The equation is as follows:

LOGIC 3351

$a = S3 \, Q1$

The crosspoint address of a connection in which a subscriber is engaged is stored in bits 20 to 31. The crosspoint address of a connection may be defined as the number of the XB switch and the number of the XC switch used to connect two subscribers. This is identical to the number of the junctor used to establish the connection. The crosspoint address of a connection is stored within the calling party's register in bits 20 to 25. The first three bits of this group identify the number of the XB switch, and the last three bits identify the XC switch.

In the memory word corresponding to the called party time slot, the crosspoint address of the connection is stored in bits 26 to 28, and bits 29 to 31 to store respectively the numbers of the XB and the XC switches.

Information is written and erased under the influence of the marker in its connection or disconnection cycles.

Two important signals are used to describe a subscriber's status. The signal L$s$ is supplied when information is stored within the bits 20 to 22, indicating that the line is connected as a calling (left side) party. The signal R$s$ is supplied whenever information is stored in the bits 26 to 28, indicating that the line is connected as a called party (right side).

The bits 16 to 31 are normally recirculated. They may be cleared by signals from erase logic units, or new information may be supplied in response to enabling signals from add logic units.

The signals to be added are supplied from translators 3480 and 3490. The translator 3480 receives as input the signals E$n$1 to E$n$6 and translates the one-out-of-six information received into a code of three bits. The translator 3490 receives as inputs the signals F$n$1 to F$n$6, and translates the one-out-of-six signal to a three bit code.

The erase logic unit 3410 supplies the signal $d$ to inhibit the gates 3411 to 3416 to clear the bits 20 to 25. The equation is as follows:

LOGIC 3410

$d = S8 \, Q2 \, Ls \, M1 \, Xm' + (M16 + M12)Sm$

In response to an add signal from gate 3420 the information from translator 3480 is written into bits 20 to 22, and the information from translator 3490 is written into bits 23 to 25. The equation is as follows:

LOGIC 3420

$a = Q3 \, M4$

The signal L$s$ is supplied by gate 3430 whenever there is any information in bits 20 to 22.

The erase logic unit 3440 supplies the signal $d$ to inhibit the gates 3441 to 3446 to clear the bits 26 to 31. The equation is as follows:

LOGIC 3440

$d = S8 \, Q2 \, Ls' \, M1 + M15 \, Sm \, Xm' + M5 \, Q3 \, Ls \, Rs \, P6 + M14 \, Sm \, S6 \, Q1$

In response to the signal $a$ from gate 3450, information from translator 3480 is written into bits 26 to 28, and information from translator 3490 is written into bits 29 to 31. The equation is as follows:

LOGIC 3450

$a = M4\ Sm$

The signal Rs is supplied through gate 3460 whenever there is any information stored in bits 26 to 28.

Figure 7:
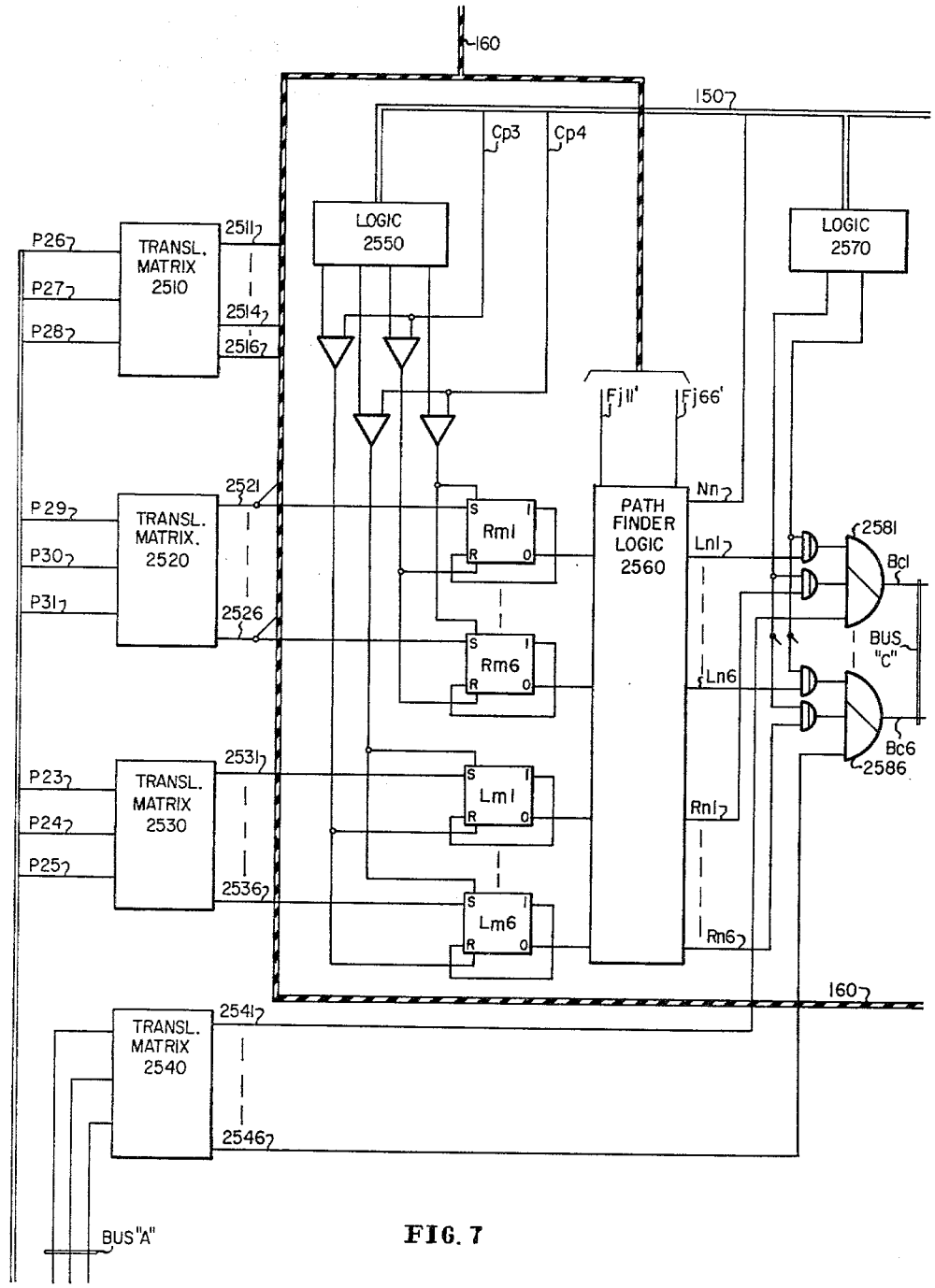
Figure 8:
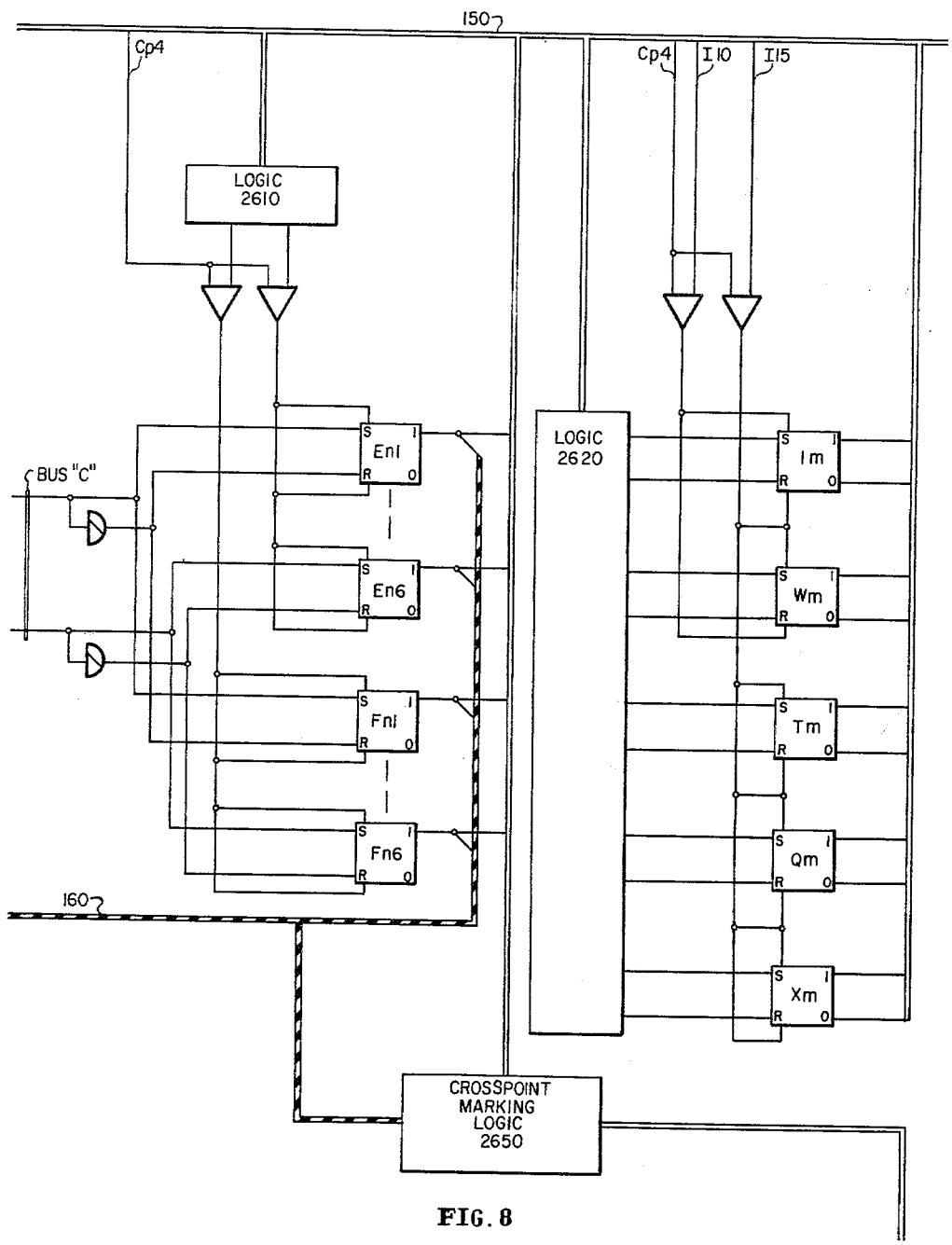
Figure 9:
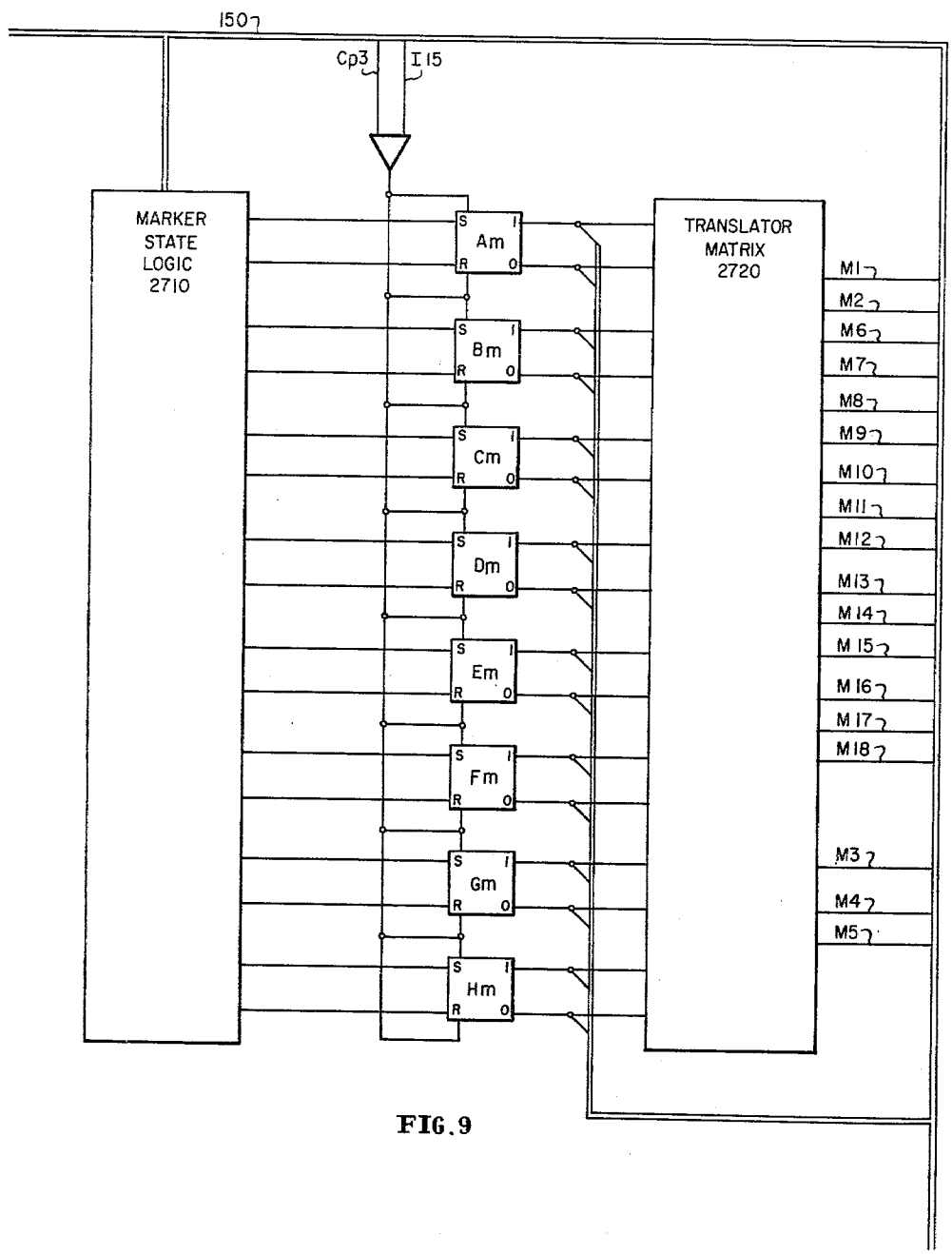
Figure 10:
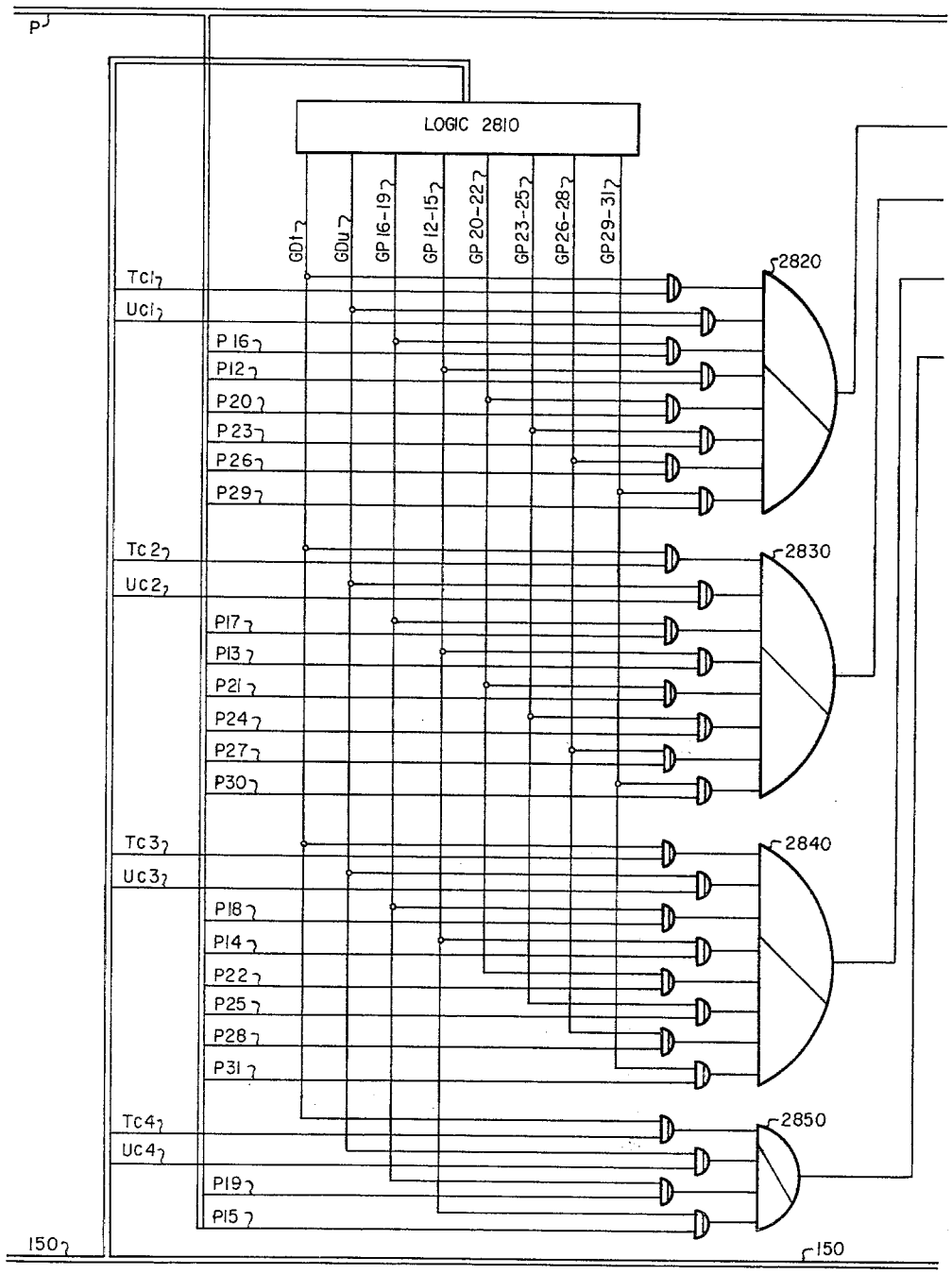
Figure 11:
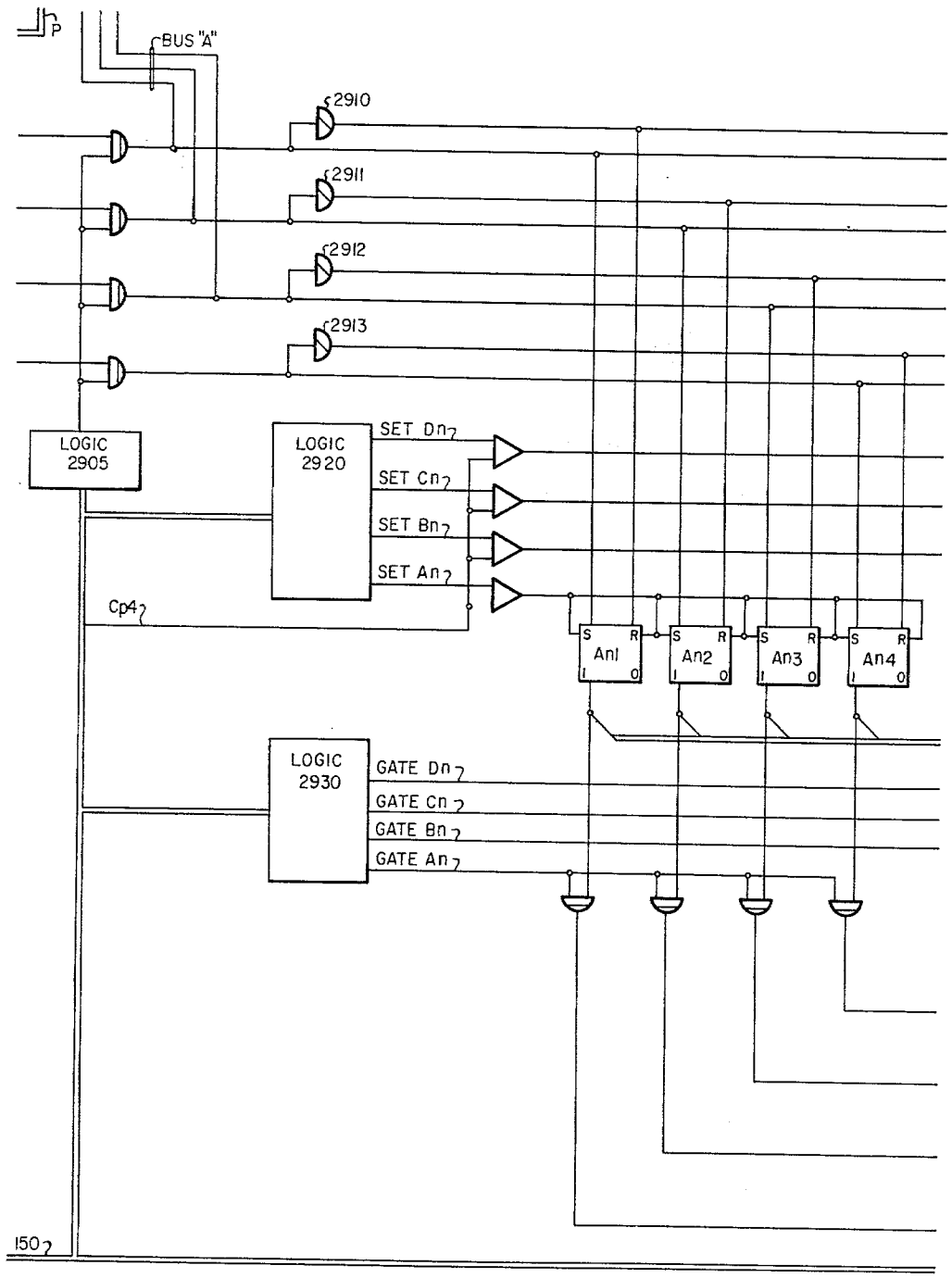
Figure 12:
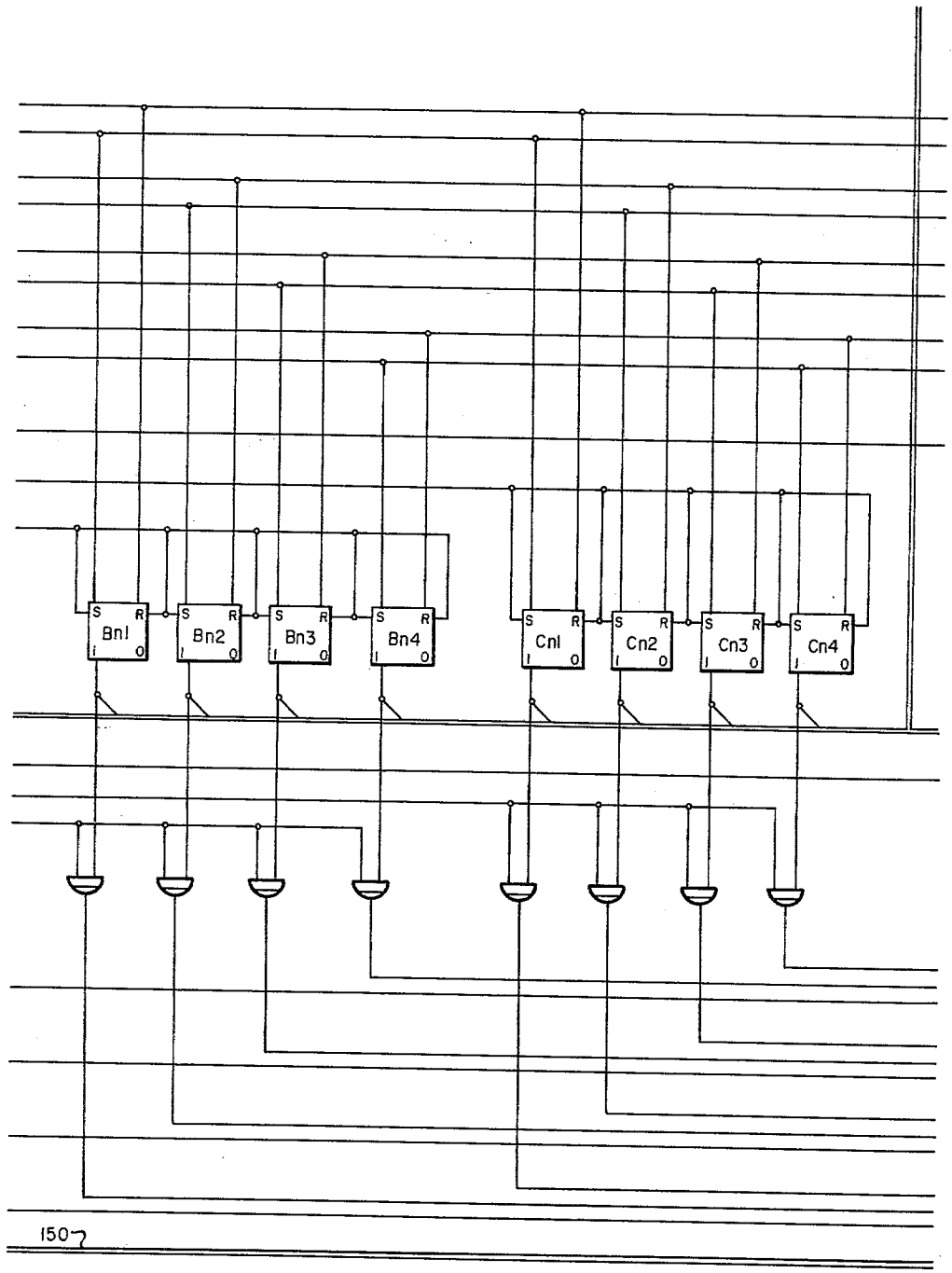
Figure 13:
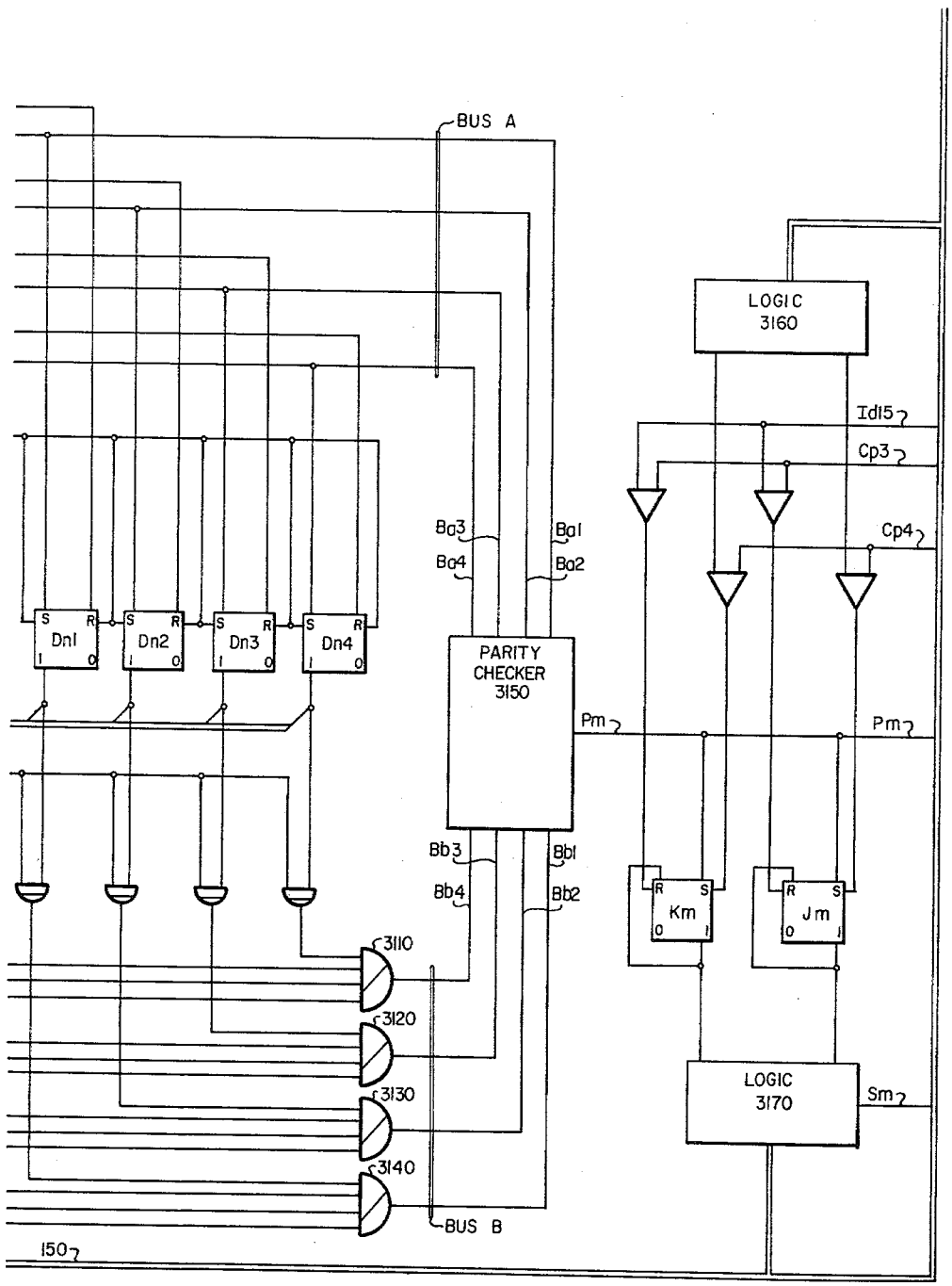

*Subscriber logic flow chart.*—The flow chart below describes the various courses of action a subscriber may follow.

equipment appears in FIG. 9. The parity checker is shown in FIGS. 10–13. The pathfinder is shown in FIG. 7 and the left side of FIG. 8. Miscellaneous flip-flops and their input logic 2620 are shown on the right side of FIG. 8.

*Marker states.*—The marker, in satisfying the demands of subscribers, may assume any one of 18 states, see Table III. These states are determined by the equipment shown in FIG. 9. Eight flip-flops Am–Hm are used to record the state under whose influence the marker is acting.

Table III

| State | Description | Am | Bm | Cm | Dm | Em | Fm | Gm | Hm |
|---|---|---|---|---|---|---|---|---|---|
| M1 | Idle | 0 | 0 | 0 | 0 | 0 | 0 | 0 | 0 |
| M2 | Busy Test | 1 | 0 | 0 | 0 | 0 | 0 | 0 | 0 |
| M3 | Route Search | | | | | | | 1 | 0 |
| M4 | Connection | | | | | | | 0 | 1 |
| M5 | Clear | | | | | | | 1 | 1 |
| M6 | Pre-Transfer | 1 | 1 | 0 | 1 | 0 | 0 | 0 | 0 |
| M7 | Transfer to Subscriber | 1 | 1 | 1 | 0 | 0 | 0 | 0 | 0 |
| M8 | Conference Hunt | 0 | 1 | 0 | 0 | 1 | 0 | 0 | 0 |
| M9 | Trunk Hunt | 1 | 1 | 0 | 0 | 1 | 0 | 0 | 0 |
| M10 | Operator Hunt | 1 | 1 | 0 | 0 | 0 | 0 | 0 | 0 |
| M11 | Night Hunt | 0 | 1 | 0 | 0 | 0 | 0 | 0 | 0 |
| M12 | Un-Silence | 1 | 0 | 1 | 0 | 1 | 0 | 0 | 0 |
| M13 | Transfer to Operator | 1 | 1 | 1 | 0 | 1 | 0 | 0 | 0 |
| M14 | Disconnect Check | 0 | 0 | 1 | 0 | 0 | 0 | 0 | 0 |
| M15 | Disconnect for Caller | 1 | 0 | 1 | 0 | 0 | 0 | 0 | 0 |
| M16 | Disconnect for Called | 1 | 0 | 0 | 1 | 0 | 0 | 0 | 0 |
| M17 | Answer Supervision (Central Office) | 0 | 0 | 0 | 1 | 0 | 0 | 0 | 0 |
| M18 | Answer Supervision (Operator) | 0 | 0 | 0 | 0 | 0 | 1 | 0 | 0 |

The state of the marker at a particular time determines its reaction to input signals. The following is a chart which describes the transitions from one marker state to another and the necessary input commands.

*Subscriber flow chart*

| From— | To— | Command |
|---|---|---|
| S1 Q1 | S1 Q4 | Hs1 Hs2 Sm(M2+M8+M9+M10+M11) |
|  | S2 Q1 | Hs1' Hs2+Hs1 Hs2' |
| S1 Q4 | S6 Q1 | M5 |
| S2 Q1 | S2 Q2 | P7 Qs1[Ls' Rs'("9"+"8")+Rs' P6 "2"+"0"] (Ls'+P6)+P7 Ux |
|  | S3 Q1 | P7 Uy+P7 Qs1 "6"(Ls'+P6) |
|  | S6 Q1 | P7 Qs1, {[Ls' Rs'("9"+"8")+Rs' P6 "2"+"3" +"6"+"0"][Ls'+P6]} |
|  | S8 Q1 | P7' Qs1 |
| S2 Q2 | S2 Q3 | M1 Ls' |
|  | S6 Q1 | M1 Ls |
| S2 Q3 | S2 Q2 | M5(Ls Rs P6+Qm) |
|  | S5 Q1 | M5 Qm' Im |
|  | S6 Q1 | M5 Im'(Ls Rs P6+Qm)' |
| S3 Q1 | S4 Q1 | P7 Qs1 |
|  | S8 Q1 | P7' Qs1 |
| S4 Q1 | S4 Q2 | P7 Qs1 P8' |
|  | S8 Q1 | P7' Qs1 |
| S4 Q2 | S4 Q3 | M1 Ls' |
|  | S6 Q1 | M1 Ls |
| S4 Q3 | S2 Q2 | M5 Qm |
|  | S4 Q2 | M5 Ls Rs P6 |
|  | S5 Q1 | M5 Qm' Im |
|  | S6 Q1 | M5 Im'(Ls Rs P6+Qm)' |
| S5 Q1 | S6 Q1 | P7'+(Ux+Uy)Sm |
| S6 Q1 | S1 Q1 | Ls' Rs' |
|  | S6 Q2 | P7 Rs P6 |
|  | S7 Q1 | Rs Uz(T5+T6+T7+T8+T9+T0)+Ls P6 Qs2 +Ls P6'+Rs P6' P7 |
|  | S8 Q1 | Ls P7' Qs1 |
| S6 Q2 | S7 Q1 | M1 |
| S7 Q1 | S1 Q1 | Ls' Rs (Ux'+Qs1) |
|  | S2 Q1 | Hs1 Hs2(Ls+Rs) |
|  | S2 Q3 | M13(Ls Rs)' Sm |
|  | S4 Q3 | M7(Ls Rs)' Sm |
| S8 Q1 | S1 Q1 | P7' Ls' Rs' |
|  | S2 Q1 | P7 |
|  | S8 Q2 | P7'(Ls+P6) |
| S8 Q2 | S6 Q1 | M1 |
| S2 Q1 | S2a Q1 | P7 Qs1 "3" Ls' Rs' |
| S2a Q1 | S3a Q1 | P7 Qs1 "6" Ls' |
| S3a Q1 | S4a Q1 | P7 Qs1 |
| S2a Q1 | } S8 Q1 | P7' Qs1 |
| S3a Q1 |  |  |
| S4a Q1 |  |  |

THE MARKER

| From— | To— | Command |
|---|---|---|
| M1 | M2 | S4 Q2 P6' Ls' |
|  | M6 | (S2+S4)Q2 P6 Ls' Rs |
|  | M7 | S4 Q2 P6 Ls Rs' |
|  | M8 | S2 Q2 P6' Ls' Rs' "6" |
|  | M9 | S2 Q2 P6' Ls' Rs' "9" Hs2 |
|  | M10 | S2 Q2 P6' Ls' ("0"+"9" Hs2+Nk' Ux) |
|  | M11 | S2 Q2 P6' Ls' Rs' Nk Ux |
|  | M12 | S2 Q2 P6 Ls Rs' "2" |
|  | M13 | S2 Q2 P6 Ls Rs' "0" |
|  | M15 | S8 Q2 Ls |
|  | M17 | S6 Q2 P6 Ls' Rs |
| M2 | } M3 | Im' Q3 |
| M6 |  |  |
| M8 |  |  |
| M9 |  |  |
| M10 |  |  |
| M11 |  |  |
| M2 | } M5 | Im Q3 |
| M6 |  |  |
| M8 |  |  |
| M9 |  |  |
| M10 |  |  |
| M11 |  |  |
| M2 | } Im Q3 |  |
| M6 |  |  |
| M8 |  |  |
| M9 |  |  |
| M10 |  |  |
| M11 |  |  |
| M3 | M4 | Im' Q3 |
| M4 | M5 | Q3 |
| M12 | M15 | Sm Ls |
| M15 | M14 | Sm Ls(Ux+Uy)Xm' |
| M14 | M16 | Sm S6 Q1 |
| M7 | M2 | Sm(Ls Rs)' |
| M13 | M10 | Sm(Ls Rs)' |
| M17 | M18 | Sm Rs |
| M10 | M2 | Tm Q3 |
| M7 | M1 | Sm Ls Rs |
| M12 | M1 | Sm Ls' |
| M13 | M1 | Sm Ls Rs |
| M14 | M1 | Sm(S6 Q1)' |
| M15 | M1 | Sm[Ls(Ux+Uy)Xm']' |
| M16 | M1 | Sm |
| M17 | M1 | Sm Rs' |
| M18 | M1 | Sm |

FIGURES 7–13 when arranged as shown in FIG. 15 comprise a diagram of the marker. The marker state equipment appears in FIG. 9. The parity checker is The flip-flops Am–Hm constitute the storage areas which receive information from cable 150 via marker state logic 2710, during Cp3 and I15. Marker state logic 2710 provides the D.C. SET and the D.C. RESET signals to flip-flops Am–Hm as follows:

MARKER STATE LOGIC 2710

Set $Am$ = $M1\ Q2[S2(P6+"9"+"0"=Ux\ Nk')+S4+S8]+Am'\ Cm\ Sm\ S6\ Q1$
Reset $Am$ = $M5\ Q3(Ls\ Rs\ P6)'+Am\ Bm'\ Sm(Cm\ Ls'+Cm\ Em'+Dm)+Bm\ Cm\ Sm\ Ls\ Rs$
Set $Bm$ = $M1\ Q2(S2\ "2"\ '+S4\ P6)$
Reset $Bm$ = $Cm\ Em'\ Sm+M5\ Q3+Bm\ Cm\ Sm\ Ls\ Rs+M10\ Tm\ Q3$
Set $Cm$ = $M1\ Q2\ Ls(S2+S4+S8)$
Reset $Cm$ = $Sm[Bm+Ls'+Am'+Em'(Ux+Uy)'+Am\ Bm'\ Cm\ Em'\ Xm]$
Set $Dm$ = $M1\ Q2\ Ls'\ P6+Am'\ Cm\ Sm\ S6\ Q1$
Reset $Dm$ = $Bm'\ Dm\ Sm+M5\ Q3(Ls\ Rs\ P6)'$
Set $Em$ = $M1\ Q2\ S2("8"+"9"\ Hs2+P6\ Ls)$
Reset $Em$ $Sm\ Cm+M5\ Q3$
Set $Fm$ = $M17\ Sm\ Rs$
Reset $Fm$ = $M18\ Sm$
Set $Gm$ = $Gm'\ Q3[Tm(M2+M10)]'$
Reset $Gm$ = $Gm\ Q3$
Set $Hm$ = $Q3(M3\ Im'+Gm'\ Im)$
Reset $Hm$ = $M5\ Q3$

*Parity checker.*—It is essential that the framework of the marker include a number of storage areas, and that information be absorbed into these areas, processed, and discarded as a systematic response to predetermined conditions.

FIGS. 10–13 show how information from sources external to the marker is allowed to reach Bus A. Distributor information Tc1–Tc4 and Uc1–Uc4 are extracted from cable 150 and memory information P12–P31 are extracted from cable P. This information is gated to the four OR gates 2820, 2830, 2840 and 2850 at the proper time which is determined by logic 2810 as follows:

LOGIC 2810

$GDt$ = $M3+I6(M2+M4+I10(Mm\ Gm'\ Hm'+M1\ Q2\ Ls')$
$GDu$ = $I8(M2+M4)+I12(Bm\ Gm'\ Hm'+M1\ Q2\ Ls')$
$GP16\text{–}19$ = $I6[M1\ Q2(Ls+P6')]+I10\ M2\ Gm'\ Hm'\ S4a\ Sm$
$GP12\text{–}15$ = $I8[M1\ Q2(Ls+P6')]+I12\ M2\ Gm'\ Hm'\ S4a\ Sm$
$GP20\text{–}22$ = $I6(Dm\ Gm'\ Hm'+M18)+I10[M1\ Q2\ Ls(S2+S4+S8)+Bm'\ Cm\ Sm]$
$GP23\text{–}25$ = $I8(Dm\ Gm'\ Hm'+M18)+I12[M1\ Q2\ Ls(S2+S4+S8)+Bm'\ Cm\ Sm]$
$GP26\text{–}28$ = $I6(Cm+M5+M1\ Q2\ Ls'\ P6+Am'\ Cm\ Sm\ S6\ Q1)+I10(M17)$
$GP29\text{–}31$ = $I8(Cm+M5+M1\ Q2\ Ls'\ P6+Am'\ Cm\ Sm\ S6\ Q1)+I12(M17)$ The output of OR gates 2820, 2830, 2840 and 2850 form the four-conductor Bus A which conveys information to the principal storage areas An1–An4, Bn1–Bn4, Cn1–Cn4 and Dn1–Dn4. The information is gated onto Bus A according to logic 2905 as follows:

LOGIC 2905

Gate Bus A = $(I6+I8)(M5+Am'\ Cm+M1\ Q2\ S8\ Ls')+(I10+I12)(M1\ Q2\ S8\ Ls+Bm'\ Cm\ Em\ Sm)$ The information is transferred from Bus A at the proper time by the gating commands from logic 2920 which is generated from the signals present in cable 150 as follows:

LOGIC 2920

Set $An = I10(M1\ Q2+Cm\ Sm+M17\ Sm)$
Set $Bn = I12(M1\ Q2+Cm\ Sm+M17\ Sm)$
Set $Cn = I6(M5\ Q3+Am'\ Cm+M1\ Q2)+I10\ Gm'\ Hm'\ Sm(Bm\ Cm'+M2\ S4a)$
Set $Dn = I8(M5\ Q3+Am'\ Cm+M1\ Q2)+I12\ Gm'\ Hm'\ Sm(Bm\ Cm'+M2\ S4a)$

The information contained in the principal storage areas is gated to the four OR gates 3110, 3120, 3130 and 3140 by the gating commands generated by logic 2930 as follows:

LOGIC 2930

Gate $An = I6(Cm+M18)+I8\ M3$
Gate $Bn = I8(Cm+M18)$
Gate $Cn = I6(M2+M4+Dm\ Gm'\ Hm')+I6\ M3$
Gate $Dn = I8(M2+M4+Dm\ Gm'\ Hm')$ Just as information from external sources was made available to the marker by placing it on Bus A, so information stored within storage areas An, Bn, Cn and Dn is presented to parity checker 3150 by gating it onto Bus B at the proper time.

Bus B is formed by the outputs of OR gates 3110, 3120, 3130 and 3140. Both Bus A and Bus B are presented to parity checker 3150.

The parity checker is a logic network that compares two binary digits, and yields an output signal ($Pm$) whenever the input from one source (Bus A) is identical to the information supplied by a second source (Bus B). The parity circuitry is an eight input network and parity is achieved according to the following boolean expression:

$$Pm = [Ba1\ Bb1 + (Ba1\ Bb1)'][Ba2\ Bb2 + (Ba2\ Bb2)']\\ [Ba3\ Bb3 + (Ba3\ Bb3)'][Ba4\ Bb4 + (Ba4\ Bb4)']$$

The principal use of the parity checker is to enable the marker to seek out a particular time slot, by one of two methods. One method is based on the fact that a called party's number as dialed by the calling party is identical to the called party's distributor address. Consequently, if the dialed-tens and dialed-units digits, as recorder in the calling party's register, are stored in storage areas Bn1–Bn4 and Cn1–Cn4 respectively, and are gated to the parity checker via Bus B coincidently with the distributor tens and units encountered during each time slot in turn, the called party will be recognized by a parity checker output $Pm$ both during the time dialed tens and distributor tens are being compared and while dialed units and distributor units are being compared.

Another method of time slot location is used to find the time slot of the party to whom another party is connected. Within each subscriber's register is recorded the crosspoint address of each connection in which the subscriber is currently participating. Thus by storing in the marker the crosspoint address of a connection and searching for a time slot in which is displayed an identical crosspoint address, the party to whom another party is connected may be located.

Because both of these methods of locating time slots depend upon the performance of two distinct parity checks during each time slot, and because the output of the parity checker persists only as long as the input signals remain identical, the results of an individual parity check must be preserved for the duration of the time slot. Two flip-flops are employed to retain parity decisions, one being set if the first evaluation produces an output, the second flip-flop responding to the second parity check.

Because the parity circuitry operates constantly, an output is developed when no information appears on both buses. Therefore, the output of the parity checker must be used judiciously. The indiscriminate setting of the parity flip-flops is prevented by explicitly specifying the conditions under which they may be set.

If parity is found, parity checker 3150 produces signal $Pm$ which sets flip-flop $Jm$ during interval I6 and flip-flop $Km$ during interval I8 in accordance with gating commands from logic 3160 as follows:

LOGIC 3160

Set $Jm = I6(M2+M4+M6+M7+M12+M13+M14+M15+M16+M17+M18)$

Set $Km = I8(M2+M4+M6+M7+M12+M13+M14 +M15+M16+M17+M18)$

The information stored in flip-flops $Km$ and $Jm$ are combined with signals from cable 150 in Logic 3170 to generate signal $Sm$ as follows:

LOGIC 3170

$Sm = Jm\ Km + Rs'\ Im\ S1\ Q1\ Hs1\ Hs2[M8(T5+T6+T7+T8+T9+T0)Uz + M9(Ux+Uy) + M10(T1+T2+T3+T4)Uz + M11\ H3] + M10\ S4a\ Im(T1+T2+T3+T4)Uz$

Intermediate quantity $Sm$ is used extensively throughout the system and, therefore, is included in cable 150. It means, in general terms, that the marker has discovered a time slot that fulfills criteria inherent in a particular marker state. For instance, when in state M2, the marker searches for the called party, whose time slot is recognized by the parity process. When flip-flops $Jm$ and $Km$ are set during the same time slot, signal $Sm$ becomes true and may be interpreted as meaning that either:

(a) Double parity has occurred
(b) The marker in state M10 has found an idle operator line
(c) The marker in state M9 has found an idle trunk
(d) The marker in state M3 has found an idle conference line
(e) The marker in state M11 has found an idle night call recipient

*Pathfinder.*—Referring now to FIGS. 7–8, binary information from Bus A is translated to a one-out-of-six code 2541–2546 by translator matrix 2540 and binary signals P23–P25, P26–P28, and P29–P31 are translated by translator matrices 2510, 2520, and 2530 to one-out-of-six codes 2531–2536, 2511–2516, and 2521–2526 respectively. Translated information 2511–2516 and 2521–2526 is added to cable 160 to provide information to crosspoint matrix 110. Translated signals 2521–2526 and 2531–2536 are gated at the proper time to flip-flops $Rm1$–$Rm6$ during $Cp3$ and in accordance with logic 2550 as follows:

LOGIC 2550
A.C. Set $Lm = I8\ M3\ Pm$
A.C. Reset $Lm = I15\ Q3$
A.C. Set $Rm = I6\ M3\ Pm$
A.C. Reset $Rm = I15\ Q3$ During state M3, pathfinder 2560 must be provided with the numbers of the XB and XC switches that are unavailable for use for a proposed connection. Storage areas $Lm$ and $Rm$ compile, during state M3, a list of the unavailable XB and XC switches respectively. There is a $Lm$ flip-flop that corresponds to each XB switch and a $Rm$ flip-flop that corresponds to each XC switch. If, during I8 of a time slot, a parity check reveals that the subscriber being reviewed is served by the same XA switch as the calling party, the flip-flop within the $Lm$ storage group corresponding to the XB switch that this subscriber is using (as recorded in his P20–P22 register) is set. The $Rm$ flip-flops are similarly set during I6 when a parity check shows a subscriber to be a member of the same tens group as the called party. Flip-flops $Rm1$–$Rm6$ are set in accordance with information found within P29–P31 registers.

Information from flip-flops $Rm1$–$Rm6$ and $Lm1$–$Lm6$ and the 36 junctor flip-flops $Fj11$–$Fj66$ from cable 160 are introduced to the pathfinder logic 2560 in order to generate the 13 signals $Ln1$–$Ln6$, $Rn1$–$Rn6$, and $Nn$ as follows:

PATHFINDER LOGIC 2560

The pathfinder determines which routes are available between the calling tens group and the called tens group.

$In11 = Lm1'\ Rm1'\ Fj11'$ (Route 11 is available)
$In12 = Lm1'\ Rm2'\ Fj12'$ (Route 12 is available)
and so on to
$In66 = Lm6'\ Rm6'\ Fj66'$ (Route 66 is available)
and in general
$Inab = Lma'\ Rmb'\ Fjab'$ (Route $ab$ is available)

The pathfinder selects one of the available routes or indicates no route available ($Nn$).

$Ln1 = In11 + In12 + In13 + In14 + In15 + In16$
$Ln2 = Ln1'\ (In21 + In22 + In23 + In24 + In25 + In26)$
$Ln3 = Ln2'\ Ln1'\ (In31 + In32 + In33 + In34 + In35 + In36)$
$Ln4 = Ln3'\ Ln2'\ Ln1'\ (In41 + In42 + In43 + In44 + In45 + In46)$
$Ln5 = Ln4'\ Ln3'\ Ln2'\ Ln1'\ (In51 + In52 + In53 + In54 + In55 + In56)$
$Ln6 = Ln5'\ Ln4'\ Ln3'\ Ln2'\ Ln1'\ (In61 + In62 + In63 + In64 + In65 + In66)$
$Rn1 = Ln1\ In11 + Ln2\ In21 + Ln3\ In31 + Ln4\ In41 + Ln5\ In51 + Ln6\ In61$
$Rn2 = Rn1'\ (Ln1\ In12 + Ln2\ In22 + Ln3\ In32 + Ln4\ In42 + Ln5\ In52 + Ln6\ In62)$
$Rn3 = Rn2'\ Rn1'\ (Ln1\ In13 + Ln2\ In23 + Ln3\ In33 + Ln4\ In43 + Ln5\ In53 + Ln6\ In63)$
$Rn4 = Rn3'\ Rn2'\ Rn1'\ (Ln1\ In14 + Ln2\ In24 + Ln3\ In34 + Ln4\ In44 + Ln5\ In54 + Ln6\ In64)$
$Rn5 = Rn4'\ Rn3'\ Rn2'\ Rn1'\ (Ln1\ In15 + Ln2\ In25 + Ln3\ In35 + Ln4\ In45 + Ln5\ In55 + Ln6\ In65)$
$Rn6 = Rn5'\ Rn4'\ Rn3'\ Rn2'\ Rn1'\ (Ln1\ In16 + Ln2\ In26 + Ln3\ In36 + Ln4\ In46 + Ln5\ In56 + Ln6\ In66)$
$Nn = Ln1'\ Ln2'\ Ln3'\ Ln4'\ Ln5'\ Ln6'$

Pathfinder information $Ln1$–$Ln6$ and $Rn1$–$Rn6$ are gated to the six OR gates 2581–2586 by logic 2570 as follows:

LOGIC 2570

Gate $Ln = I10(M3\ Im'\ Q3)$
Gate $Rn = I12(M3\ Im'\ Q3)$

The output of OR gates 2581–2586 form Bus C to provide information to flip-flops $En1$–$En6$ and $Fn1$–$Fn6$. Signals $En1$–$En6$ and $Fn1$–$Fn6$ are transferred to cables 150 and 160 at the proper time by the commands from logic 2610 as follows:

LOGIC 2610

A.C. Set $En = I6(M5 + Am\ Cm + M1\ Q2 + S8\ Ls') + I10(M1\ Q2\ S8\ Ls + Bm'\ Cm\ Em\ Sm + Me\ Im'\ Q3)$
A.C. Set $Fn = I8(M5 + Am'\ CM + M1\ Q2\ S8\ Ls') + I12(M1\ Q2\ S8\ Ls + Bm'\ Cm\ Em\ Sm + M3\ Im'Q3)$

The $En$ and $Fn$ storage areas are used to convey crosspoint addresses from the pathfinder to the crosspoint network via cable 160 and to subscribers in process of establishing a connection via cable 150. These storage areas are also used to convey information from a subscriber to the crosspoint network in the case of the disconnection. Information continually appears at the D.C. set input of these flip-flops. The number of these flip-flops within the $En$ group or $Fn$ group is the same as the number of XD or XC switches within the crosspoint network because the coding of these switches is of a one-out-of-N basis. Consequently, translation matrix 2540 is necessary between Bus A and Bus C in order to change the coding of crosspoint address information used in the subscriber's register to conform with the code recognized by the crosspoint network.

The signals *ou, ot, rt*, and *ru* required by the crosspoint network from the marker via cable 160 are derived from the outputs of flip-flops $An1$–$An4$, $Bn1$–$Bn4$, $Cn1$–$Cn4$, and $Dn1$–$Dn4$ by way of buffer amplifiers and translation matrices in the crosspoint marking logic unit 2650 (FIG. 8). The A.C. commands for the junctor flip-flops are generated in logic unit 2650 as follows:

LOGIC 2650

$SJP = (I8 + I10 + I12 + I13)M4\ Q3\ Cp3$
$RJP = [Sm(M15\ Xm' + M16) + M5\ Q3(A1 + Ar)]Cp4$ $SRP = M4\ Q3(I8 + I10 + I12 + I13)Cp4$
$RRP = [Tb(S6 + Q4)' + Sm(M15\ Xm' + M16)]$
$(I8 + I10 + I12 + I13)Cp4$

*Miscellaneous flip-flops.*—The flip-flops $Im$, $Wm$, $Tm$, $Qm$, and $Xm$ are used to generate miscellaneous commands. The flip-flop $Im$ is set to indicate that a proposed connection is impossible. Flip-flop $Tm$ is set to indicate that a dialed number is not equipped with line equipment. Flip-flop $Qm$ indicates that a trunk is involved in the pending connection. Flip-flop $Wm$ is set at the beginning of state M4 and reset at the end of state M5. Finally, flip-flop $Xm$ is associated with the operations involving the operator. These flip-flops are set and reset by logic 2620 as follows:

LOGIC 2620

D.C. Set $Im = M1\ Q2\ S2\ (P6' + Ls\ "O") + M2\ Gm'\ Hm'$
$S4a'\ Sm(S1' + Hs2' + Hs1') + M3\ Nn + M6$
$Sm\ Ls\ Rs$

D.C. Reset $Im = M5\ Q3 + Sm(M8 + M9 + M10 + M11)$

D.C. Set $Wm = M3\ Im'\ Q3$

D.C. Reset $Wm = M5\ Q3$

D.C. Set $Tm = (U11 + U12)\ (M4\ Sm + M3\ Im'\ Q3)$
$+ (M2 + M10)\ Sm\ S4a\ Gm'\ Hm'$

D.C. Reset $Tm = (U11 + U12)'\ M4\ Sm + M5\ Q3\ Ux + (M2$
$+ M10)\ Gm'\ Hm'\ Q3$ D.C. Set $Qm = Sm\ Hs1'\ Hs2' + M10\ Im\ Q3\ Ux$ D.C. Reset $Qm = M5\ Q3$ D.C. Set $Xm = M13\ Sm(Ls + Rs)' + S8\ Q1\ P6\ Ls\ P7'\ Aa$
$Ba\ Ca$ D.C. Reset $Xm = M5\ Q3 + M15\ Sm$ The miscellaneous flip-flops provide information which is included in cable 150 at the proper time by gating commands from the distributor to the A.C. set and reset leads of the flip-flops.

CONNECTIONS

When the marker is idle and encounters the time slot of a subscriber who has completed dialing three digits (corresponding to the telephone number of a second subscriber), it must perform a series of operations that will result in the establishment of an audio connection between the two subscribers.

Before concerning itself with the problem of establishing the connection, the marker enters a 16-millisecond busy-test cycle which will determine if the called party is available. Before leaving the time slot of the calling party, the marker absorbs into its storage areas the last two digits dialed by the calling party. These digits correspond to the distributor address (time slot) of the called party. Through the use of its parity-checking apparatus during the subsequent review of time slots, the marker can identify the time slot of the called party and, by analyzing the memory word of the subscriber, determine if he is free to become a called party. No further action occurs until the calling party's time slot is again encountered.

When the question of subscriber availability has been resolved, the marker must concern itself with the selection of an available route through the crosspoint network which will link the two subscribers.

The route-search cycle begins at the end of the time slot of the calling party, and persists for a complete machine cycle. During the cycle, the marker inspects the memory word of each subscriber within the system, and notes which B switches and which C switches are in service. B switches currently in use by subscribers who are served by the same A switch as the calling party are listed by the marker as unavailable for the proposed connection. Similarly, C switches being used by subscribers of the same D switch as the called party are noted as being unavailable. During the cycle the transmission network supplies the marker with information regarding junctor availability so that, when the time slot of the calling party is again reviewed, the marker has determined which, if any, routes may be employed in establishing the required connection and which one, if more than one are free, is to be used.

Immediately following a successful route-search cycle are two complete machine cycles, during which the marker instructs the crosspoint switching network as to the crosspoint route that must be activated. During these cycles the marker informs the subscriber logic of the nature of the connection, in order that the memory words of the participating parties may be revised accordingly. At the completion of these cycles the marker returns to the idle condition. The process of establishing a connection has taken a total of 48 milliseconds.

*Local connection.*—Let us assume that local subscriber L32 (calling party) wishes to call another local subscriber L68 (called party). When the calling party removes his handset from the cradle, the common control subscriber logic will review his status and, if conditions are proper, will order that dial tone be returned to the subscriber to direct him to commence dialing.

By dialing the access digit "6," a PABX subscriber makes known to the subscriber logic that he wishes to make a local call. Upon dialing the second and third digits, which represent the "tens" and "units" of the called party's address, a demand for marker action is established. If the subscriber meets all conditions as an eligible party, the marker will locate, route, and establish a connection. The calling party will be connected on the left and called party will be connected on the right-hand side of the switching network.

Ringback tone and ringing frequency will be returned to the calling party and called party respectively. After the called party L68 answers, he will have established an audio connection through the crosspoint network to calling party L32.

Table IV shows the states of the calling and called parties and of the marker, and the commands which produce the changes of state during the call. An asterisk (*) indicates that a command occurs in the same time slot as the command immediately above it in the table.

*Table IV*

| Command | States | | |
|---|---|---|---|
| | Marker | L32 | L68 |
| Hs1' Hs2 | | S1 Q1 | S1 Q1 |
| P7 Qs1 "6" Ls' | | S2 Q1 | |
| P7 Qs1 | | S3 Q1 | |
| P7 Qs1 | | S4 Q1 | |
| | | S4 Q2 | |
| M1 Ls' | M1 | | |
| *S4 Q2 P6' Ls' | | S4 Q3 | |
| Hs1 Hs2 Sm M2 | M2 | | |
| Im' Q3 | | | S1 Q4 |
| Im' Q3 | M3 | | |
| Q3 M4 | M4 | | |
| M5 | M5 | | |
| M5 Im' (Ls Rs P6 + Qm)' | | S6 Q1 | S6 Q1 |
| *Q3 (Ls Rs P6) | M1 | | |
| Ls P6' | | S7 Q1 | |
| Rs P6' P7 | | | S7 Q1 |
| Hs1 Hs2 Ls | | S2 Q1 | |
| Hs1 Hs2 Rs | | | S2 Q1 |
| P7' Qs1 | | S8 Q1 | |
| P7' Qs1 | | | S8 Q1 |
| P7' Ls | | S8 Q2 | |
| M1 | M1 | | |
| *S8 Q2 Ls | M15 | S6 Q1 | |
| Sm[Ls(Ux+Uy)Xm']' | M1 | | |
| Ls' Rs' | | S1 Q1 | |
| P7' Ls' Rs' | | | S1 Q1 |

Initially line 32 is in state S1 Q1. To initiate the call the subscriber removes his handset, and since his is an unrestricted line, his signal over highway H1 becomes false which causes the line to go to state S2 Q1. Dial tone is then received and the subscriber dials the digit 6. After the end of the digit, bit 7 remains true, the timer P9–P11 counts to seven and the signals Qs1 becomes true. The line is then advanced to state S3 Q1. The tens digit "6" is then dialed and upon P7 Qs1 again becoming true the line advances to state S4 Q1. The units digit 8 is then dialed. Upon P7 Qs1 becoming true the subscriber state is advanced to state S4 Q2. The signal Q2 is a demand for the marker.

When the marker is in state M1, and in scanning the time slot of the calling line detects the signal condition S4 Q2 P6' Ls', it absorbs information into its memory flip-flops. During interval I6 the dialed tens digit from leads P16–P19 is placed by way of Bus A into the flip-flops Cn1–Cn4. During interval I8 the dialed units digit from leads P12–P15 is placed by way of Bus A into flip-flops Dn1–Dn4. During interval I10 the distributor tens digit on leads Tc1–Tc4 is placed by way of Bus A into the flip-flops An1–An4, and during interval I12 the distributor units digit from leads Uc1–Uc4 is placed by way of Bus A into the flip-flops Dn1–Dn4. Thus the calling parties address 32 is stored in flip-flops An1–An4 and Bn1–Bn4, and the address 68 of the called party is stored in flip-flops Cn1–Cn4 and Dn1–Dn4. At the end of the time slot the marker responds to the signal condition S4 Q2 P6' Ls' to advance to state M2, and the subscriber logic responds to the signal condition M1 Ls' to advance to state S4 Q3.

During state M2 the marker scans the successive time slots to find the time slot of the called party. In interval I6 of each time slot distributor tens information from leas Tc1–Tc4 is placed on Bus A and the dialed tens information from flip-flops Cn1–Cn4 is placed on Bus B, and in time slots in which these are the same the parity signal Pm is generated to set the flip-flop Jm. During interval I8 the distributor units information from leads Uc1–Uc4 is placed on Bus A, and the called units information from flip-flops Dn1–Dn4 is placed on Bus B, and when they agree the parity signal Pm is generated to set the flip-flop Km. In a time slot in which both of the flip-flops Jm and Km are set, the signal Sm is generated. If the called party is busy (S1 Q1 Hs1 Hs2)' a flip-flop Im in the marker is set to convey this information to the calling subscriber. The marker continues to advance through the time slots until it finds the signal Q3, which indicates the time slot of the calling party. If the called party is idle (flip-flop Im has not been set), the marker responds to the condition Im' Q3 to change to state M3.

During state M3, the marker reviews all time slots to find and choose an available route. During interval I6 of each time slot the distributor tens signals from leads Tc1–Tc4 are applied to Bus A and the called tens identity from flip-flops Cn1–Cn4 is placed on Bus B; and in response to parity as indicated by the signal Pm, the information as to the XC switch used by that line as recorded in bits 29–31 is gated to set the corresponding flip-flop of the group Rm1–Rm6. During the interval I8 of each time slot the distributor tens signal Tc1–Tc4 is applied to Bus A and the calling tens number stored in flip-flops An1–An4 is applied to Bus B, and in response to parity as indicated by the signal Pm the information as to the B switch used as recorded in bits 20–22 is used to set the corresponding one of the flip-flops Lm1–Lm6. When the marker reaches the calling party time slot as indicated by the signal Q3 the path-finder outputs are available. This information is gated by way of Bus B to set one of the flip-flops En1–En6 to designate the switch XB to be used, and to set one of the flip-flops Fn1–Fn6 to designate which switch XC is to be used in the connection.

At the end of the calling party's time slot, the marker, in response to the signal Im' Q3, advances to state M4.

During marker states M4 and M5 the crosspoint connection between the called party and calling party is established and the subscribers participating in the connection are informed of the details thereof.

As the marker changes from state M3 to M4, flip-flop Wm is set to indicate to the crosspoint network that the links should be marked in preparation for the firing of a junctor. The identity of the link to be marked is inherent in the calling and called party addresses stored in flip-flops An1–An4, Bn1–Bn4, Cn1–Cn4 and Dn1–Dn4 respectively. This information is supplied through the crosspoint marking logic unit 2650 (FIG. 8) to supply the signals ot3, ou2, rt6, and ru8 to the link markers. Flip-flop Wm is not reset, and consequently the links are continuously marked, until the end of state M5. At the end of state M4, the junctor J41 as identified by the setting of flip-flops En4 and Fn1, is fired by the setting of the junctor flip-flop. The ringing flip-flop within the junctor is set at substantially the same time to apply ringing tone and ring-back tone to the lines.

During state M4 the marker also makes a parity check of the distributor tens and units with the called party number tens and units as stored in the flip-flop Cn1–Cn4 and Dn1–Dn4. In response to the parity signal Sm, the information from flip-flop En4 is coded and stored in bits 26–28 and the information from flip-flop Fn1 is coded and stored in bits 29–31 of the called party memory word. At the end of state M4 the time slot of the calling party is identified by signal Q3 occurring, and in response thereto the information from flip-flop En4 is coded and stored in bits 20–22, and the information from flip-flop Fn1 is coded and stored in bits 23–25 of the calling party memory word.

At the end of the time slot, in response to the signal Q3, the marker enters state M5. In response to the signal M5, both the calling and the called party advance to state S6 Q1. The marker returns to the idle state M1.

The calling party in response to the signal Ls P6' immediately advances to state S7 Q1. The called party remains in state S6 Q1 while he is being sent ringing tone. When the called party answers his signal P7 becomes true and therefore in response to the condition Rs P6' P7 he advances to S7 Q1.

During conversation the sequence states of both parties remain in state S7 Q1. When either party hangs up, in response to the signal Hs1 Hs2 (Ls+Rs) the sequence state of that party is sent to state S2 Q1. Then when the timing signal Qs1 appears in coincidence with P7' the sequence state of the party is advanced to state S8 Q1. The system uses calling party release. Thus in the calling party's time slot in response to the signal P7' Ls he is advanced to state S8 Q2. When the marker is in its idle state M1 it responds to the signal S8 Q2 Ls to advance to state M15. At the end of the same time slot the sequence state of the calling subscriber is sent to state S6 Q1.

In marker state M15, the left hand routing information registered in bits 20–25 of the calling party memory word is transferred into the memory flip-flops An1–An4 and Bn1–Bn4 to enable the marker to locate the time slot of the called party by a routing party check. The flip-flops En4 and Fn1 will throughout state M15, supply to the transmission network the address of the junctor J41 to be extinguished. When the time slot of the called party is located (flip-flops An1–An4 equal to bits 26–28 and flip-flops Bn1–Bn4 equal to bits 29–31), the signal Sm becomes true.

While the calling subscriber is in state S8 Q2 and the marker is in state M1 the bits 20–25 of the calling subscriber are erased in response to the signal d=S8 Q2 Ls M1 Xm'.

In the called party's time slot as indicated by the parity signal Sm during marker state M15 the bits 26–31 of the called party memory word are erased in response to the signal d=M15 Sm Xm'. In response to the signal condition Sm[Ls(Ux+Uy)Xm']' the marker returns to state M1. Both the calling and the called party sequence states return to the idle state S1 Q1, the calling party in response to the signal condition Ls' Rs', and the called party in response to the condition P7 Ls' Rs'.

*The hunting sequence.*—Whenever the marker is called upon to connect a subscriber line to any one of a group of lines (as in the case of a subscriber calling a trunk) the marker must select not only an idle member of the group but one to which a free transmission path exists as well. Each type of line-hunting activity is characterized by a search for a line fulfilling criteria based upon some quality of the peculiar class of lines. A search for a trunk will culminate in the discovery of a time slot designated by U$x$ or U$y$, because only trunks are assigned these locations. A time slot exhibiting H3 would satisfy the marker when searching out a line to which to connect an incoming PBX trunk call during nightservice hours. Of course any line to be selected must be idle.

Another factor that is a part of the criteria common to all hunting operations must also be considered. Once the marker has selected a particular line to which it will attempt to discover a free route, it must become insensitive to other lines which might satisfy the basic conditions of the search. When the marker enters the hunting state, a flip-flop, I$m$ is set. The flip-flop remains set only so long as the marker is unable to locate a subscriber fulfilling the hunt criteria. When a line is selected, the flip-flop I$m$ is reset; this prevents the marker from actively continuing the hunt.

When a line has been selected as a prospective called line, and its distributor address absorbed into the marker, the marker returns to the time slot of the calling subscriber and enters a route-search cycle state M3. If successful, the marker in states M4 and M5 instructs the transmission network to establish the connection. If, however, the route search is unsuccessful and no free route is found, the marker re-enters the hunting state and attempts to select another line for use as a called line. It must now pass over the line that was previously selected. To accomplish this, every line, upon being selected as a called party, is acted upon to display state Q4. The common criteria which must be fulfilled in order for a line to be selected as a called party during a hunting action have now been expanded to include:

(1) The line must be idle.
(2) The marker must not have previously selected a line during the same hunt sequence.
(3) The line must not have been previously selected during the same call.

The use of the flip-flop I$m$ as the device that allows the marker to actively search proves advantageous; if no line is selected during the hunting cycle, signal I$m$ will still be true when the calling party's time slot is encountered—a condition that indicates that the desired connection is unobtainable.

*Call to operator.*—Let us now assume an incoming call from a PBX trunk L3$x$. The central office subscriber dials an assigned number and accesses the PABX via a trunk hunting connector in the central office. Upon seizure of the PABX the subscriber logic goes from state S1 Q1 to state S2 Q1. In response to the signal condition P7 U$x$ the subscriber logic is then immediately changed to state S2 Q2 to demand the marker. Then the subscriber logic in response to the signal M1 L$s'$ goes to state S2 Q3 and the marker goes to state M10 in response to the condition $$S2\ Q2\ P6'\ Ls'\ Nk'\ Ux$$

Also assume that the operator's line L3$z$ is busy, and that the line L4$z$ is idle but there is no route available to it. Finally assume that the connection is possible to line L1$z$. Table V shows the states of the various lines and of the marker, and the commands which produce the changes of state during the call. An asterisk (\*) indicates that the command occurs in the same time slot as the command immediately above it in the table.

Table V

| Command | States | | | |
|---|---|---|---|---|
| | Marker | L3x | L4z | L1z |
| Hs1 Hs2'  | | S1 Q1 | | |
|  | | S2 Q1 | | |
| P7 Ux | | S2 Q2 | | |
| M1 Ls' | M1 | S2 Q3 | | |
| *S2 Q2 P6' Ls' Kk' Ux | M10 | | | |
| Hs1 Hs2 Sm M10 | | | S1 Q4 | |
| Im' Q3 | M3 | | | |
| Im Q3 | M10 | | | |
| Hs1 Hs2 Sm M10 | | | | S1 Q4 |
| Im' Q3 | M3 | | | |
| Im' Q3 | M4 | | | |
| Q3 | M5 | | | |
| M5 | | | | S6 Q1 |
| M5 Im' (Ls Rs P6+Qm)' | | S6 Q1 | | |

While still in state M1, during interval I10 of the calling party's time slot, the marker sets the busy test flip-flop I$m$ in response to the command M1 Q2 S2 L$s$ "0." Also while still in state M1 during intervals I10 and I12 of the calling party's time slot, the distributor tens and distributor units information is absorbed into flip-flops A$n$1–A$n$4 and B$n$1–B$n$4 respectively.

The marker in state M10 then scans all of the time slots in search of the condition $$Im\ S1\ Q1\ Hs1\ Hs2\ Uz(T1+T2+T3+T4)$$

Upon finding this condition fulfilled the signal S$m$ is generated; and in response thereto, during interval I10 the distributor tens signals are stored in flip-flops C$n$1–C$n$4, and during interval I12 the distributor units signals are stored in flip-flops D$n$1–D$n$4. Upon the signal S$m$ becoming true during state M10 the line is identified as being one of the desired group and as being idle and is thus placed into state S1 Q4. Also with signal S$m$ true, during I15 of the time slot, the busy indicating flip-flop I$m$ is reset.

Upon reaching the calling line time slot as indicated by signal Q3, with flip-flop I$m$ reset, the marker goes to state M3. It was assumed that the line L3$z$ was busy and therefore that the line selected and stored in flip-flops C$n$1–C$n$4 and D$n$1–D$n$4 is L4$z$.

The marker now goes through a route search and path-finding operation the same as for a local call. It has been assumed that there is no route available between calling line L3$x$ and called line L4$z$. Therefore, the flip-flop I$m$ becomes set during this route search. Upon reaching the calling line time slot as identified by the signal Q3 the marker therefore returns to state M10.

Now line L3$z$ is busy and line L4$z$ is tagged with the signal Q4. Therefore, during the time slot of line L4$z$ in the equation for generating S$m$, the condition Q1 is not true and this line is passed over. In the time slot of line L1$z$ the condition for generating the signal S$m$ is satisfied, and the flip-flop I$m$ is reset. Then in the time slot of the calling line, in response to Q3, the marker again goes to state M3. This time the route search is successful, and in response to the condition I$m'$ Q3 the marker goes to state M4. As for local calls the marker during states M4 and M5 establishes the connection and the sequence states of the two subscribers L3$x$ and L1$z$ go to state S6 Q1. The connection then proceeds as for a local call and therefore is not shown in Table V.

CALL REROUTING

According to the invention, an arrangement is provided within the subscriber logic 116 and the marker 118 which permits calls to a local line or an operator line to be rerouted to any desired local line. For operator lines this supplants the night service arrangement.

To utilize this rerouting service, the local subscriber or operator dials a special digit ("3") and follows it with the three digits of the number of the local line to which it is desired to have calls rerouted. The line loop is then left closed (off-hook condition) until it is desired to revoke the reroute action. Replacing the handset on the cradle returns the status of the line to normal.

The subscriber logic 116 is arranged to include special subscriber states S2a, S3a, and S4a, and provisions in the subscriber flow chart involving these states; so that in response to dialing signals from a line which is to have its calls rerouted, there is registered in the memory-word of that line the number of the line to which calls are to be rerouted.

Assume that a subscriber on line L11 puts the call rerouting service in effect for his line. The operation may be understood by reference to the subscriber flow chart. The subscriber lifts his handset, causing either Hs1 or Hs2 to become false. The command ($Hs1'$ $Hs2 + Hs1$ $Hs2'$) advances the sequence state of the subscriber from state S1 Q1 to S2 Q1. Upon dialing the special digit "3" the command (P7 $Qs1$ "3" $Ls'$ $Rs'$) advances the state from S2 Q1 to S2a Q1. The subscriber then dials the three digit number (say 668) of the line L68 which is to receive the rerouted calls. After the initial digit "6" is received, the command (P7 $Qs1$ "6" $Ls'$) advances the state from S2a Q1 to S3a Q1. After the next digit the command (P7 $Qs1$) advances the state from S3a Q1 to S4a Q1. After the last digit the subscriber state is at S4a Q1, and remains there as long as the off hook condition continues. The distributor address (68) of the line which is to receive the rerouted calls is registered in bits 12–19.

Assume now that the subscriber on line L32 initiates a call to line L11. The call proceeds as for any local call, until the marker, during the busy test cycle, state M2, detects that the called line L11 is in state S4a Q1. The marker then absorbs into flip-flops $Cn1$–$Cn4$ and $Dn1$–$Dn4$ the tens and units digits of the line L68, from the memory word (bits 12–19) of line L11. Flip-flop $Im$ is *not* set, but instead flip-flop $Tm$ is set. The significant equations occurring in the time slot of line L11 are as follows:

$Sm = Jm\ Km$
$GP16\text{–}19 = I10\ M2\ Gm'\ Hm'\ S4a\ Sm$
$GP12\text{–}15 = I12\ M2\ Gm'\ Hm'\ S4a\ Sm$
Set $Cn = I10\ Gm'\ Hm'\ Sm\ M2\ S4a$
Set $Dn = I12\ Gm'\ Hm'\ Sm\ M2\ S4a$
D.C. Set $Im = M2\ Gm'\ Hm'\ S4a'\ Sm(S1' + Hs1' + Hs2')$
D.C. Set $Tm = M2\ Sm\ S4a\ Gm'\ Hm'$ The above equations show that the time slot of the called line L11 is identified as for normal calls to a local line, generating parity signal $Sm$ in response to the setting of both parity checking flip-flops $Jm$ and $Km$. In this same time slot 11, the signal S4a occurs, so that during interval I10 the signal GP16–19 is generated to gate the tens digit from the memory word of line L11, via leads P16–P19 to Bus A, and the signal set $Cn$ is also generated so that the digit is stored in flip-flops $Cn1$–$Cn4$. Similarly during interval I12 the signals GP12–15 and set Dn are generated to gate the units digit via leads P12–P15 and Bus A to flip-flops $Dn1$–$Dn4$.

With flip-flop $Tm$ set, the condition ($Tm\ M2$)′ in the equation for setting the flip-flop $Gm$ prevents the marker from entering state M3 when the signal Q3 appears in the time slot of the calling line L32. The marker therefore remains in state M2. Flip-flop $Tm$ is reset in response to the condition ($M2\ Gm'\ Hm'\ Q3$).

During the second busy test cycle, state M2, line L68 appears as the called line in the marker memory flip-flops $Cn1$–$Cn4$ and $Dn1$–$Dn4$. The calling line L32 is still in state S4 Q3. The sequence then continues as for a normal call to establish a connection from line L32 to line L68.

To enable calls to operator lines to be rerouted, the hunting criteria for state M10, that is, the part of the expression for signal $Sm$ relating to that state, includes the term $M10\ S4a\ Im\ Uz\ (T1 + T2 + T3 + T4)$. Should $M10\ Sm\ S4a$ become true, flip-flop $Tm$ is set.

Also in response to the parity check signal $Sm$, the distributor address of the operator line is gated from leads $Tc1$–$Tc4$ and $Uc1$–$Uc4$ by way of Bus A to flip-flops $Cn1$–$Cn4$ and $Dn1$–$Dn4$ by logic units 2810 and 2920.

$GDt = I10\ Bm\ Gm'\ Hm'$
$GDu = I12\ Bm\ Gm'\ Hm'$
Set $Cn = I10\ Gm'\ Hm'\ Sm\ Bm\ Cm'$
Set $Dn = I12\ Gm'\ Hm'\ Sm\ Bm\ Cm'$

Then during interval I15 of the time slot of the calling line, the marker goes from state M10 to state M2, by resetting flip-flop $Bm$ in response to the condition ($M10\ Tm\ Q3$). Flip-Flop $Tm$ is reset.

With the address of the operator line stored in the marker memory flip-flops as the called line, and the marker in state M2, the rerouting is then accomplished as explained for a call to subscriber line L11.

While we have described above the principles of our invention is connection with specific apparatus, it is to be clearly understood that this description is made only by way of example and not as a limitation to the scope of our invention.

What is claimed is:

1. A communication switching system comprising a switching network for selectively establishing connections between any one of a plurality of originating paths and any one of a plurality of terminating paths by one of a plurality of possible routes; a plurality of line circuits and associated lines, each line circuit having an individual connection to an originating path and an individual connection to a terminating path, a plurality of registers individual to the line circuits, each register including a set of storage elements for recording the sequence state of calls at the associated line and a set of storage elements for recording called line number designations, control equipment for controlling storage in the registers, signalling connections from the line circuits to the control equipment to forward supervisory and call signals from the lines, means in the control equipment responsive to an off-hook signal from a calling line via its signal connection to cause a calling state to be recorded in the sequence state set of that line's register, means in the control equipment responsive to call signals from the calling line via its signal connection to cause a corresponding number to be recorded in the called number set of that line's register; a marker having connections to the control equipment and to the switching network, means in the control equipment responsive to the completion of a called number designation and recording of a corresponding sequence state in the register of the calling line to cause the marker to be seized, means in the marker to make a busy test of the called line by accessing the called line register via the control equipment to determine the sequence state stored therein and if in an idle state to find an available route and cause a connection to be established through the switching network between the originating path of the calling line and the terminating path of the called line by way of the route found;

means included in said control equipment to respond to a call signal which designates a reroute request from a first one of said lines via its signal connection followed by the call signals designating the number of a second of said lines to record in the first-line register called-number set the designation of said second line and to record a reroute condition state in the sequence-state set of the first line, means included in said marker which during a call in which said first line is being called and the busy test finds the reroute condition state, responds thereto to receive from the first-line register the designation of the second line, and then makes a busy test of the second line and if idle searches for a route and causes a connection to be completed between the third line and the second line.

2. A communication switching system as claimed in claim 1, including a multiplex memory arrangement wherein said registers are individually associated with time slots in recurring cycles, and distributor means is provided which identifies each time slot as it occurs;

the called path numerical designation being supplied to storage apparatus of the marker during one occurrence of the time slot of said first-line register; and wherein said marker includes parity checking apparatus for comparing information in its storage apparatus received from one register during its time slot to information in the other registers during their time slots and for generating a parity signal upon finding a specified agreement of such information; the called line busy test being made in response to parity of the information in the marker storage apparatus with the distributor address;

wherein the marker in making the busy test of said first-line in response to said reroute condition substitutes in its storage apparatus the designation of said second-line as being the called line, and sets a bistable device, and then in the time slot of said third line in response to the bistable device being set causes another busy test to be made with the second-line as the called line.

3. A communication switching system as claimed in claim 2, wherein certain of said lines comprise a group, means to indicate that a call is to be completed to any idle line of said group and means responsive to the indication to cause the marker to enter a hunting state to find an idle line of said group and select it as the called line, means responsive to the selected line being in the reroute condition to set said bistable device, means responsive to the bistable device being set with the marker in said hunting state to cause the marker to enter the busy test state and make a busy test of said selected line and receive therefrom the designation of the line to which calls are to be rerouted, and then to make another busy test upon the last said line as the called line and if idle to complete the call thereto.

4. A communication switching system as claimed in claim 1, wherein said reroute condition state remains recorded in the sequence state set of said first line as long as the supervisory signals received via its signal connection indicate an off-hook condition of the line, and means in the control equipment responsive to supervisory signals received from the first line indicating an on-hook condition to cause the recording in the sequence-state set to change to idle.

References Cited by the Examiner

UNITED STATES PATENTS

| | | | |
|---|---|---|---|
| 2,833,863 | 5/58 | Kosten | 179—18 |
| 2,909,607 | 10/59 | Nilsson et al. | 179—18 |
| 2,957,047 | 10/60 | Wennemer | 179—18 |

ROBERT H. ROSE, *Primary Examiner.*

WILLIAM C. COOPER, *Examiner.*